US008594678B2

(12) United States Patent
Livneh

(10) Patent No.: US 8,594,678 B2
(45) Date of Patent: Nov. 26, 2013

(54) BACKHAUL NETWORK FOR FEMTO BASE STATIONS

(75) Inventor: Noah Livneh, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 1340 days.

(21) Appl. No.: 11/954,851

(22) Filed: Dec. 12, 2007

(65) Prior Publication Data

US 2008/0261602 A1    Oct. 23, 2008

Related U.S. Application Data

(60) Provisional application No. 60/912,677, filed on Apr. 18, 2007.

(51) Int. Cl.
H04W 36/00    (2009.01)
H04W 40/00    (2009.01)
H04W 72/00    (2009.01)
H04W 4/00     (2009.01)

(52) U.S. Cl.
USPC ........... 455/444; 455/443; 455/448; 455/453; 370/328

(58) Field of Classification Search
USPC ............ 370/328, 331; 455/442, 443, 444
See application file for complete search history.

(56) References Cited

U.S. PATENT DOCUMENTS

| | | | |
|---|---|---|---|
| 5,371,738 A * | 12/1994 | Moelard et al. ............. | 370/331 |
| 6,996,086 B2 | 2/2006 | Wolfe et al. | |
| 7,684,798 B2 | 3/2010 | Sengodan et al. | |
| 7,912,013 B2 | 3/2011 | Qi et al. | |
| 2002/0159409 A1 * | 10/2002 | Wolfe et al. ................... | 370/329 |
| 2004/0005894 A1 * | 1/2004 | Trossen et al. ............... | 455/436 |
| 2004/0029602 A1 | 2/2004 | Kunihiro | |
| 2005/0148368 A1 | 7/2005 | Scheinert et al. | |
| 2006/0084436 A1 | 4/2006 | Green et al. | |
| 2006/0203795 A1 | 9/2006 | Welborn et al. | |
| 2007/0097938 A1 * | 5/2007 | Nylander et al. ............ | 370/338 |
| 2008/0268844 A1 * | 10/2008 | Ma et al. ...................... | 455/436 |

FOREIGN PATENT DOCUMENTS

| | | |
|---|---|---|
| EP | 1612995 | 1/2006 |
| JP | 6132888 A | 5/1994 |
| JP | 9051573 A | 2/1997 |
| JP | 2003258704 A | 9/2003 |
| JP | 2004007457 A | 1/2004 |
| RU | 2201034 C2 | 3/2003 |

(Continued)

OTHER PUBLICATIONS

International Search Report—PCT/US08/060689—International Search Authority, European Patent Office—Oct. 6, 2008.

(Continued)

Primary Examiner — Huy C Ho

(57) ABSTRACT

Providing an inter-femto Base Station (fBS) network to facilitate low interference, low power cellular access utilizing two or more fBSs is provided herein. For example, a group of fBSs can be inter-connected by a wired and/or wireless communication network. Multiple fBSs then can link with a mobile device and coordinate cellular traffic amongst the fBS network to facilitate hand-off related communication. Additionally, cellular traffic can be forwarded from one or more fBSs to an appropriate fBS designated to carry cellular traffic for each mobile device. Furthermore, by inter-connecting multiple fBSs, multi-base station cellular-type hand-off can be supported by the fBS network, while preserving predetermined cellular interface constraints associated with such mobile devices.

28 Claims, 12 Drawing Sheets

(56) References Cited

FOREIGN PATENT DOCUMENTS

| TW | 553558 U | 9/2003 |
| --- | --- | --- |
| TW | I249306 B | 2/2006 |
| WO | WO9914897 A2 | 3/1999 |
| WO | 0178246 | 10/2001 |
| WO | 2005122622 A1 | 12/2005 |
| WO | WO2007040449 A1 | 4/2007 |
| WO | WO2007040453 A2 | 4/2007 |
| WO | WO2007040454 A2 | 4/2007 |

OTHER PUBLICATIONS

Written Opinion—PCT/US08/060689—International Search Authority, European Patent Office—Oct. 6, 2008.
Smarat Ganguly et.al., "Performance Optimizations for Deploying VoIP Services in Mesh Networks", IEEE Journal on Selected Areas in Communications, U.S.A., IEEE, Nov. 2006, vol. 24, Issue.11,pp. 2147-2158.
Taiwan Search Report—TW097114374—TIPO—Jan. 2, 2013.

* cited by examiner

BACKHAUL NETWORK FOR FEMTO BASE STATIONS

CROSS-REFERENCE TO RELATED APPLICATIONS

This patent application claims the benefit of and priority to Provisional Patent Application No. 60/912,677, filed on Apr. 18, 2007, and entitled "Methods and Apparatus for Providing Backhaul Network for Femto Base Stations," which is hereby expressly incorporated by reference herein.

BACKGROUND

1. Field

The following description relates generally to wireless communications, and more particularity to utilization and control of femto Base Stations in a cellular communication network.

2. Background

Typical radio access cellular networks operate by way of various radio transmission devices, or base stations. These base stations provide wireless access to wireless mobile devices, such as cellular phones, to a core network of a cellular service provider. The base stations along with various data routing and control mechanisms (e.g., base station controllers, core and edge routers, and so on) facilitate remote communication for the mobile devices. As communication service providers expand base station coverage, more land areas can be covered by the radio access network. However, some areas can be difficult to provide reliable radio coverage, for various reasons such as population, high mobile traffic, interference with other transmitters, or materials that absorb base station transmission (e.g., dense, concrete and steel buildings, underground facilities, and the like).

One solution to provide mobile communication support to areas where radio access is difficult, is a 'personal' base station, or femto Base Station (fBS) (also termed, e.g., a home Node B or Femto cell). An fBS is a relatively small range device (compared with standard radio network base stations, such as a Node-B) that facilitates wireless communication over a licensed cellular radio band (as opposed to an unlicensed band, utilized by wireless local area network routers). The fBS can maintain a wireless link with cellular devices over such a network band, in a similar manner as a Node-B base station. Consequently, an fBS can provide small range cellular coverage for an area that does not receive a good signal from a radio access base station. Often, an individual consumer might utilize an fBS in their home, an apartment building, an office building, and so on, for personal cellular access.

Although the fBS communicates with cellular devices via licensed radio network communication, it communicates with a core cellular network or cellular control module via an Internet Protocol (IP) connection. For instance, an fBS will typically connect to a digital subscriber line (DSL), a coaxial TV cable carrying broadband IP, a broadband over power line (BPL) connection, or the like. The fBS can utilize the IP connection to communicate with a provider's cellular network equipment over the Internet, for instance, or via a direct connection between an IP server and a cellular traffic control device (e.g., a radio network controller (RNC) or fBS aggregator). FBS devices, as described, can help to overcome some of the problems associated with typical radio network coverage, and can therefore be valuable tools for cellular network service providers.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

Providing an inter-femto Base Station (fBS) network to facilitate low interference, low power cellular access over one or more fBSs is provided herein. For example, a group of fBSs can be inter-connected by a wired or wireless communication network. Multiple fBSs then can link with a mobile device and coordinate cellular traffic amongst the fBS network to facilitate hand-off related communication. Conventionally, a single fBS is designated to carry cellular traffic for a predetermined mobile device or set of devices (e.g., related by a service plan), and will deny cellular network access to all other non-predetermined mobile devices. In addition, conventional fBS devices have no mechanism that facilitates direct inter-fBS communication. As a result, an fBS typically ignores communication originating from a device that it is not designated to route traffic for, because the fBS has no mechanism to relay such traffic to an appropriate fBS, and therefore cannot act as an interface to a cellular network for such device.

Although fBS devices can provide very good localized cellular coverage, the low interference and low power consumption benefits of multi-base station cellular-type communication (e.g., code division multiple access [CDMA], universal mobile telecommunication system [UMTS], and so on) involve at least some communication amongst base stations. Therefore, by inter-connecting multiple fBSs via an fBS network, direct (and/or indirect) inter-fBS communication is provided, enabling cellular-type hand-off among the multiple fBSs, even though only a single fBS ultimately routes the cellular traffic to a core cellular network. As a result, a mobile device can communicate with alternate networked fBS devices (e.g., including one or more fBS devices have better transmission characteristics than a designated fBS) while having traffic routed to an fBS designated for such device.

According to some aspects of the claimed subject matter, a method of providing an fBS backhaul network for interfacing a mobile device with a cellular network is described herein. The method can comprise supporting a communication link between a mobile device at a first fBS, and communicatively coupling the first fBS with a neighboring fBS. In addition, the method can comprise routing at least a portion of traffic associated with the communication link to a cellular network by way of the neighboring fBS.

According to additional aspects, an apparatus that provides a fBS backhaul network to interface a mobile device with a cellular network is provided. The apparatus can comprise a first transceiver that supports a communication link between a mobile device at a first fBS and a second transceiver that communicatively couples the first fBS with a neighboring fBS. Additionally, the apparatus can include memory containing an inter-fBS application module for directing cellular related traffic between the first fBS and the neighboring fBS. According to further aspects, the apparatus can also include a network processor that routes at least a portion of traffic associated with the communication link to a cellular network by way of the neighboring fBS.

Another aspect of the claimed subject matter relates to at least one processor configured to provide a fBS backhaul network for interfacing a mobile device with a cellular network. Particularly, the processor can comprise a first module for supporting a communication link between a mobile device at a first fBS, a second module for communicatively coupling the first fBS with a neighboring fBS, and a third module for routing at least a portion of traffic associated with the communication link to a cellular network by way of the neighboring fBS.

Additionally aspects relate to another apparatus that provides a fBS backhaul network to interface a mobile device with a cellular network. The apparatus can comprise a means for supporting a communication link between a mobile device at a first fBS as well as a means for communicatively coupling the first fBS with a neighboring fBS. Also, the apparatus can comprise a means for routing at least a portion of traffic associated with the communication link to a cellular network by way of the neighboring fBS.

According to still other aspects, a computer program product that facilitates providing an fBS backhaul network for cellular network interface is provided. The computer program product can comprise a computer-readable medium that also comprises a first set of codes for causing a computer to support a communication link between a mobile device at a first fBS, and a second set of codes for causing a computer to communicatively couple the first fBS with a neighboring fBS. The computer-readable medium can also comprise a third set of codes for causing a computer to route at least a portion of traffic associated with the communication link to a cellular network by way of the neighboring fBS.

According to one or more other aspects, a method for managing a multi-fBS interface to a cellular network is provided. The method can comprise receiving information related to a data link between a first fBS and a mobile device, and facilitating transfer of at least a portion of cellular traffic carried over the data link to a neighboring fBS. Further, the neighboring fBS is communicatively coupled at least in part to a cellular link assigned to carry fBS-related traffic for the mobile device.

Further aspects provide for a an apparatus configured to manage a multi-fBS interface to a cellular network. The apparatus can comprise a input interface that receives information related to a data link between a first fBS and a mobile device and memory at the apparatus configured to store application modules for the apparatus. Moreover, the apparatus can comprise an aggregation processor that facilitates transfer of at least a portion of cellular traffic carried over the data link to a neighboring fBS. Specifically, the neighboring fBS is communicatively coupled at least in part to a cellular link assigned to carry fBS-related traffic for the mobile device.

In addition to the foregoing, one or more aspects relate to at least one processor configured to manage a multi-fBS interface to a cellular network. The processor can comprise a first module for receiving information related to a data link between a first fBS and a mobile device and a second module for facilitating transfer of at least a portion of cellular traffic carried over the data link to a neighboring fBS. Moreover, the neighboring fBS is communicatively coupled at least in part to a cellular link assigned to carry fBS-related traffic for the mobile device.

Further aspects relate to an apparatus that manages a multi-fBS interface to a cellular network. The apparatus can comprise a means for receiving information related to a data link between a first fBS and a mobile device, as well as a means for facilitating transfer of at least a portion of cellular traffic carried over the data link to a neighboring fBS. According to particular aspects, the neighboring fBS is communicatively coupled at least in part to a cellular link assigned to carry fBS-related traffic for the mobile device.

Also disclosed is a computer program product that manages a multi-fBS interface to a cellular network. The computer program can comprise a computer-readable medium, which further comprises a first set of codes for receiving information related to a data link between a first fBS and a mobile device. Additionally, the computer-readable medium can comprise a second set of codes for facilitating transfer of at least a portion of cellular traffic carried over the data link to a neighboring fBS, where the neighboring fBS is communicatively coupled at least in part to a cellular link assigned to carry fBS-related traffic for the mobile device.

According to further aspects a method of interfacing a mobile device with a cellular network by way of a fBS backhaul network is also disclosed. The method can comprise forming a wireless communication between a mobile device and an fBS and transmitting at least a portion of cellular traffic by way of the wireless communication to the fBS. Additionally, the method can also comprise directing the fBS to forward the portion of the cellular traffic to a second fBS, the second fBS is connected to a cellular interface affiliated with the mobile device.

According to still other aspects, an apparatus configured to interface a mobile device with a cellular network by way of a fBS backhaul network is provided. The apparatus can comprise a transmitter that forms a wireless data link for a mobile device with an fBS and a transmission processor that transmits at least a portion of cellular traffic to the fBS. According to additional aspects the apparatus can also comprise a mobile device memory containing an application module configured to instruct the fBS to route the portion of the cellular traffic transmitted over the wireless data link to a second fBS, where the second fBS is connected to a cellular interface affiliated with the mobile device.

In addition to the foregoing, also provided is at least one processor configured to interface a mobile device with a cellular network by way of a fBS backhaul network. The processor(s) can comprise a first module that forms a wireless data link for a mobile device with an fBS and a second module that transmits at least a portion of cellular traffic to the fBS. Furthermore, the processor can comprise a third module that instructs the fBS to route the portion of the cellular traffic transmitted over the wireless data link to a second fBS that is connected to a cellular interface affiliated with the mobile device.

Additional aspects relate to an apparatus that manages a multi-fBS interface to a cellular network. The apparatus can comprise a means for forming a wireless data link for a mobile device with an fBS and a means for transmitting at least a portion of cellular traffic to the fBS. Further, the apparatus can comprise a means for instructing the fBS to route the portion of the cellular traffic transmitted over the wireless data link to a second fBS that is connected to a cellular interface affiliated with the mobile device.

According to one or more further aspects, provided is a computer program product that manages a multi-fBS interface to a cellular network. The computer program product can comprise a computer-readable medium that can further comprise a first set of codes for forming a wireless communication between a mobile device and an fBS and a second set of codes for transmitting at least a portion of cellular traffic by way of the wireless communication to the fBS. Moreover, the computer-readable medium can comprise a third set of codes for directing the fBS to forward the portion of the cellular traffic to a second fBS, the second fBS is connected to a cellular interface affiliated with the mobile device.

DETAILED DESCRIPTION

Figure 1:
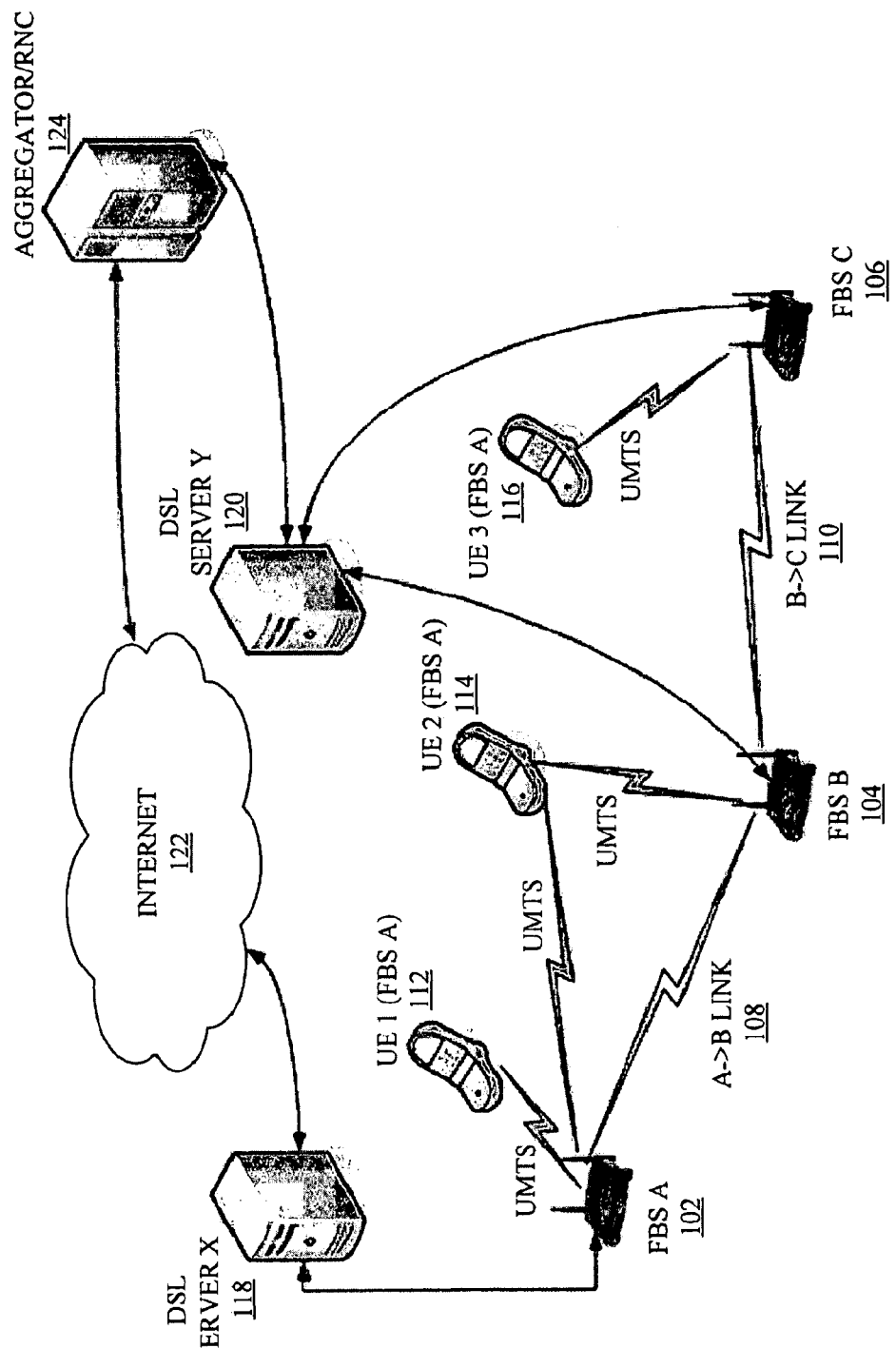
FIG. 1 depicts an example system diagram of an fBS network that provides an interface between mobile devices and cellular provider control equipment.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

Femto Base Stations (fBS) can be deployed to individual consumers and placed in homes, apartment buildings, office buildings, and the like. An fBS can communicate with a cellular device in range of the fBS utilizing a licensed cellular transmission band. Further, fBSs are connected to a core cellular network by way of an Internet Protocol (IP) connection, such as a digital subscriber line (DSL, e.g., including asymmetric DSL (ADSL), high data rate DSL (HDSL), very high speed DSL (VDSL), etc.), a TV cable carrying Internet Protocol (IP) traffic, a broadband over power line (BPL) connection, or like connection. Typically, the Internet service for the IP connection is paid for by the consumer. Also, the connection between the IP line and the cellular network can be a direct connection, or by way of the Internet. An fBS therefore, can provide cellular support to a cellular handset and route cellular traffic (e.g., voice, data, video, audio, Internet, and so on) to a macro cellular network through the IP connection. This mechanism can save consumers air time costs and reduce a network provider's cellular network traffic load. Also, cellular coverage inside a home/office building/apartment can be greatly improved by the fBS.

Typically, although an fBS is capable of forming a cellular link (e.g., a wireless link utilizing one or more licensed radio network frequencies) with multiple cellular devices, a consumer desires only his or her own traffic to be carried by a private IP connection connected to the fBS. For instance, the consumer may wish to preserve IP bandwidth for their own use, rather than for the use of other mobile device users. As a result, an fBS is generally associated only with a single mobile handset or group of handsets; traffic related to such handset(s) is routed over the consumer's IP connection, whereas traffic related to other devices is blocked. Consequently, although the fBS can communicate with multiple handsets regardless of subscriber, the fBS is typically programmed to ignore devices that are not associated with a particular consumer, service plan, or the like.

Although association of an fBS with one or a group of mobile devices is useful for preserving a consumer's IP bandwidth, it can restrict the full range of benefits provided by a multi-base station cellular communication architecture (e.g., code division multiple access (CDMA), universal mobile telecommunication system [UMTS], global system for mobile communication [GSM]-type technology, and so on). Specifically, low interference and low transmission power benefits provided by multi-base station hand-off (HO) are not available if a link with only one base station is permitted. As a result, cellular system capacity and call success rate can be substantially reduced. Some calls which would have been easily supported by a deployed network of fBS devices, for instance, were they permitted to communicate with all suitable mobile devices in range, would be dropped because of a lack of proper HO capability.

In certain circumstances, it is not uncommon for a group of fBS devices to be in relatively close proximity with other such devices. For instance, in apartment buildings or condominium complexes, several fBS devices can be densely spaced together. Even in office buildings or in residential areas, multiple fBS units can be within a relatively short range. Moreover, a common feature of the fBS is utilization or incorporation of a wireless local area network (WLAN) transceiver (e.g., wireless fidelity (WiFi) or 802.11'x', including 802.11a, b, g, n, and so on). In addition, the fBS is constantly connected to a power line and may have BPL capabilities as well. Such capability also enables multiple fBS devices, if in WLAN range or inter-connected by wired (e.g., Ethernet) connection, to inter-communicate.

In order to provide multi-base station HO support for an un-planned or semi-planned deployment of fBSs, the subject disclosure provides for a backhaul network of fBS devices. The backhaul network can effected by way of WLAN, BPL, and/or wired Ethernet connections, for instance, between the fBSs. Alternatively, or in addition, fBS devices can be interconnected by cellular transmission over universal mobile telecommunication system (UMTS) time division domain (TDD) transmissions, or wireless fidelity (WiFi) over UMTS TDD components, or combinations of the foregoing or of like wired or wireless communication mechanisms. A backhaul fBS network can also be a mesh network (e.g., enabling multiple 'hops' from fBS devices, as described in more detail herein, see the discussion with respect to FIG. 1, infra).

As described, an fBS network can provide flexible backhaul routes to a core cellular network. Particularly, fBS devices can receive cellular traffic from one or more mobile devices, and forward the traffic via the fBS network to an IP connection affiliated with each mobile device. An IP server (e.g., DSL server, cable IP server, and so on) can then route the traffic to a cellular network by way of a data network such as the Internet, or a direct connection with the cellular network. As a result, multiple fBSs can maintain concurrent data links with one or more mobile devices, enabling device HOs. A cluster of fBSs can therefore provide multi-base station transmission characteristics (e.g., by minimizing interference and transmission power of devices) while adhering to consumer desires to have only permitted traffic be routed over their IP connection.

In addition to the foregoing, compensation can be provided to an owner of an fBS whose bandwidth is utilized to forward traffic to a cellular network via the fBS from a mobile device unrelated to the owner Because the fBS utilizes an IP connection unaffiliated with the cellular network/provider or the unrelated mobile device (e.g., the link between the fBS and the cellular network is not wholly owned by a cellular service provider), it can be desirable to compensate an owner of the fBS (e.g., providing a credit on a cellular service bill, a voucher that can be redeemed with the cellular service provider and/or an affiliate/partner of such provider, or the like) for bandwidth utilized in routing traffic from the unrelated mobile device. The compensation can be based on time required to send the traffic, bandwidth utilized in sending the traffic, or a combination of these or like factors. Additionally, the amount of compensation can be tabulated at the fBS or an fBS controller on an fBS network, a component of the cellular service provider (e.g., an RNC or a remote fBS controller), or a combination of these or like mechanisms. Accordingly, a benefit can be provided to owners of fBS devices to compensate such owners for utilization of IP bandwidth in routing cellular traffic to a cellular provider over such bandwidth.

Various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of an ad-hoc or unplanned/semi-planned deployed group of wireless fBS devices, inter-connected by way of a WLAN, BPL, Ethernet, or like network. One skilled in the art should appreciate that similar techniques could apply to other communication environments as well.

As used in this disclosure, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described herein.

Furthermore, various aspects are described herein in connection with a mobile device. A subscriber station can also be called a system, a subscriber unit, mobile station, mobile, subscriber station, cellular device, multi-mode device, remote station, remote terminal, access terminal, user terminal, user agent, a user device, or user equipment. A subscriber station can be a cellular telephone, a cordless telephone, a Session Initiation Protocol (SIP) phone, a personal digital assistant (PDA), a handheld device having wireless connection capability, or other processing device connected to a wireless modem or similar mechanism facilitating wireless communication with a processing device. It should be appreciated that a mobile device as used herein can be any suitable standard compliant device as defined by various mobile phone standards. Additionally, where indicated, a mobile device can include standard and/or non-standard modifications to logic modules, control functions or the like, in order to facilitate a backhaul fBS network as described herein (e.g., see FIG. 9, supra).

Moreover, various aspects or features described herein can be implemented as a method, apparatus, or article of manufacture using standard programming and/or engineering techniques. Further, the steps and/or actions of a method or algorithm described in connection with the aspects disclosed herein may be embodied directly in hardware, in a software module executed by a processor, or in a combination of the two. Additionally, in some aspects, the steps and/or actions of a method or algorithm may reside as at least one or any combination or set of codes and/or instructions on a machine readable medium and/or computer readable medium, which may be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates an example system 100 diagram of an fBS network that provides an interface between mobile devices and cellular network equipment. Particularly, the fBS network (102, 104, 106, 108, 110) provides a cellular interface for mobile devices affiliated with a particular fBS (and IP connection), by way of any suitable fBS device in the network (102, 104, 106, 108, 110). More specifically, traffic received at an fBS can be routed to the fBS and IP connection designated to carry that traffic (e.g., associated with a specific mobile device, or group of devices on a particular service plan, or the like). As a result of the foregoing, a mobile device is not restricted to communicating with a designated fBS; instead, the device can form a communication link with the most appropriate fBS(s) depending on interference, distance and load constraints. Thus, system 100 can provide low power and low interference benefits of a multi-base station communication architecture in conjunction with strong localized wireless coverage provided by the fBS network (102-110).

System 100 includes multiple fBSs, specifically, fBS A 102, fBS B, 104, and fBS C 106. The fBSs (102, 104, 106) are inter-connected by way of wireless (or wired) communication links 108, 110. A→B Link 108 connects fBS A 102 and fBS B 104. B→C Link 110 connects fBS B 104 and fBS C 106. The links (108, 110) can be by way of a WLAN connection (e.g., 802.11a, b, g, n, wireless fidelity (WiFi) and so on, or related wireless technology), BPL connection, or wired connection (e.g., Ethernet), for instance. Alternatively, or in addition, the links (108, 110) can be a universal mobile transmission system (UMTS) time division domain (TDD) link using a licensed radio frequency owned by a cellular operator and an appropriate UMTS TDD modem. In addition the links (108, 110) can be WiFi implemented over UMTS TDD spectra, or a combination of the foregoing or like connections. For instance, A→B Link 108 can be a WLAN link, and B→C Link 110 can be a wired Ethernet link. As depicted, no direct interface between fBS A 102 and fBS C 106 exists, although an fBS network (102, 104, 106, 108, 110) in accordance with the scope of the subject disclosure can have any suitable number of inter-connections between individual fBSs (102, 104, 106) of the network (102, 104, 106, 108, 110).

System 100 also includes several user equipment devices (UEs) 112, 114, 116 (e.g., standard compliant mobile devices such as cell phones, mobile phones, multi-mode devices, and so on, that comply with various suitable standards for mobile phone technology). As depicted, each of the UEs are affiliated with fBS A 102. Therefore, cellular traffic associated with the UEs 112, 114, 116 is to be routed to a cellular network via an IP connection associated with fBS A 102 (e.g., owned by a consumer who purchased/leased fBS A 102 and its IP connection, and owns a service plan associated with UEs 112, 114, 114). Thus, in one aspect, system 100 will not directly utilize IP connections of fBS B 104 and fBS C 106 to interface UEs 112, 114, 116 with cellular network equipment (124).

Although cellular traffic of the UEs 112, 114, 116 is routed to an IP connection associated with fBS A 102, any suitable fBS (102, 104, 106) can provide an interface between a UE (112, 114, 116) and the femto backhaul network (102-110). As a result, an fBS (102, 104, 106) that is closest to a particular UE (112, 114, 116), or that has a lowest contemporaneous cellular traffic load, or that has a lowest contemporaneous interference, or an appropriate quality of service (QoS) level for data or voice traffic, as suitable, or a combination thereof can provide such interface. The described aspects provide for FBS B 104 or fBS C 106 to route any cellular traffice associated with UEs (112, 114, 116) to fBS A 102.

In addition to the foregoing, each fBS (102, 104, 106) depicted in FIG. 1 is connected to an IP connection that interfaces the fBS (102, 104, 106) with an IP server (118, 120). The IP server (118, 120) can be provided and maintained by an Internet service provider (ISP), for instance. Specifically, fBS A 102 is connected to DSL Server X 118, and fBSs B and C 104, 106 are both connected to DSL Server Y 120. The IP connections depicted (lines and arrows connecting the fBSs 102, 104, 106 and servers 118, 120) are DSL connections (e.g., ADSL, HDSL, VDSL or the like) as their respective servers (118, 120) are DSL servers. However, it should be appreciated that any suitable connection where at least a portion of the last mile interface between and IP server (e.g., DSL server 118, 120, a cable IP server, BPL server, etc.) and consumer equipment can be utilized (e.g., DSL, cable, BPL, or like connection, whether or not in conjunction with a WLAN or like wireless transmitter). Alternatively, or in addition, the IP connection can be a satellite IP connection, where an Earth orbiting satellite device (not depicted) that provides an interface between an IP data network (e.g., Internet 122) and an fBS (102, 104, 106).

System 100 also includes a connection between IP servers 118, 120 and cellular network equipment, in this instance, a radio network controller (RNC) or fBS aggregator 124. The connection can be via the Internet 122, where both an IP server (e.g., DSL Server X 118) and the RNC/fBS Aggregator 124 are properly configured to be identified and to communicate over the Internet 122 (e.g., where both devices 118, 124 have suitable IP and/or media access control (MAC) addresses interfaced with the Internet, and so on). Additionally, an IP server (118, 120) can have a direct connection to the RNC/fBS aggregator 124, as depicted by DSL Server Y 120, for instance. For example, a DSL network operator (associated with DSL Server Y 120) might have an operating agreement with a cellular operator (associated with RNC/fBS aggregator 124). Pursuant to the agreement, a link between equipment (120, 124) owned by the operators can be established to interface cellular and IP services for suitable customers. Consequently, system 100 can interface a core cellular network (e.g., represented at least in part by the RNC/fBS aggregator 124) with networked fBS devices (102, 104, 106) by way of a suitable data network such as the Internet 122 or a direct connection between cellular and IP servers (120, 124).

As depicted by FIG. 1, A→B Link 108 and B→C Link 110 are direct wireless (e.g., WLAN) links between fBSs A and B (102, 104) and fBSs B and C (104, 106), respectively. No direct link between fBSs A and C (102, 106) exists. As a result, UE 1 (fBS A) 112 is best served by its own fBS (102), which it is closest to. Traffic associated with UE 1 (fBS A) 112 can be directly routed to an ISP (at 118) and then to the cellular network (124) via the Internet. UE 2 (fBS A) 114 is in a place where a soft HO can be maintained between fBSs A and B (102, 104). For instance, UE 2 (fBS A) 114 can be equally served by both fBSs (102, 104) or, for instance, somewhat better served by fBS B 104. As a result, traffic directed to FBS B 104 is relayed to fBS A 102 for transmission to the cellular RNC/fBS aggregator 124. Management of the HO can be carried out by the backhaul network between fBSs A and B (102, 104), or directed by the mobile device (e.g., UE 2 (fBS A) 114), or remotely by the RNC/fBS aggregator 124, as discussed below.

Also as depicted, UE 3 (fBS A) 116 is best served by fBS C 106. It should be noted that fBS C 106 has no direct connection with the fBS (102) designated for delivering the payload traffic associated with UE 3 (fBS A) 116 to the cellular network. However, by routing traffic through fBS B 104, the traffic can be relayed to fBS A 102 and from there to the cellular network (124). This requires 2 'hops' over the fBS network (102, 104, 106, 108, 110), and some network management, also discussed below.

Effectuating mobile device HO amongst two or more base stations, including fBSs (102, 104, 106), typically involves various network support and management criteria. First, connectivity parameters between base stations (102, 104, 106) are mapped. The connectivity parameters can include load (e.g., a number of devices served and/or an amount of bandwidth utilized at the fBS 102, 104, 106), interference, signal strength between the fBS (102, 104, 106) and nearby fBSs (102, 104, 106) and/or mobile devices (112, 114, 116), QoS parameters between the fBS (102, 104, 106) and network server (118, 120) (including, e.g., ping rates, packet loss, packet priority, and packet transmission consistency measured, for instance, by consecutive order of sent and received packets at a device), other propagation measurements (e.g., contemporaneous bandwidth and/or data rate, a packet buffer size, etc.) or like parameters or combinations thereof. Connectivity can be mapped, for example, by a mapping application (not depicted at FIG. 1, but see FIGS. 9, 10, and 11) at an fBS (102, 104, 106) (e.g., see FIG. 10), at a mobile device (112, 114, 116) (e.g., see FIG. 9), at a cellular network RNC (124) (e.g., see FIG. 11), or at an IP server (118, 120), or at a combination of such locations.

In addition, mobile device (112, 114, 116) HO typically involves management by a cellular network RNC/fBS aggregator 124. Such management can be based on the connectivity of each fBS (102, 104, 106) for instance. Consequently, a transmission connectivity map generated by a mobile device (112, 114, 116), fBS (102, 104, 106), IP server (118, 120), or RNC (124) or interactions between such components can be utilized to manage and effectuate the mobile device HO.

Since transmission parameters, such as load and propagation, can change over time, the mapping application (discussed above) can take periodic transmission measurements to compile a dynamic connectivity map. In addition, these parameters can be evaluated for at least two types of transmission, voice traffic (e.g., VoIP) and data traffic (e.g., downloading data files from the Internet). Specifically, for voice traffic transmission parameters, as discussed herein, are typically configured/adjusted to provide suitable QoS whereas for data traffic the transmission parameters are configured/adjusted for suitable data rate. Connectivity for system 100 can be mapped for connections (108, 110) between neighboring fBSs (102, 104, 106), UMTS (or related cellular) connections between UEs (112, 114, 116) and the fBSs (102, 104, 106), or between the fBSs and the network servers (118, 120). In addition, connectivity over the Internet 122 can be measured and utilized in certain circumstances (e.g., Internet delay). At the fBSs (102, 104, 106) or UEs (112, 114, 116), an autonomous algorithm (e.g., included as part of the mapping application discussed above) can be stored in memory and use broadcast transmissions between neighboring devices to measure connectivity with immediate (e.g., single hop) neighbors. For instance, the broadcast transmissions can include parameter interrogations, responses to which can indicate link quality and availability, described above, as well as provide a connectivity map of a neighboring fBS (102, 104, 106). Connectivity maps provided by neighboring devices can enable multi-hop links between such devices. Alternatively, or in addition, a connectivity map compiled at one of the fBSs (102, 104, 106) can be sent to RNC/fBS aggregator 124 to control HOs. Particularly, the RNC/fBS aggregator can make decisions that identify an active set of fBSs for each ongoing call (e.g., an active set can include all suitable fBSs 102, 104, 106 that are in range of and can support a threshold level of communication with a device 112, 114, 116). Alternatively, or in addition, a connectivity or routing module located at one or more of the fBSs 102, 104, 106 and/or one or more UEs 112, 114, 116 can develop an active set of fBSs (102, 104, 106) for calls served by the fBS network (102-110) or related to the UE (112, 114, 116), respectively.

Further, an algorithm managed by RNC/fBS aggregator 124 (e.g., included as part of the mapping application, discussed above) can interrogate fBS (102, 104, 106) devices and/or UEs (112, 114, 116), in a similar manner as described above. The algorithm can run on the RNC (124) which collects and stores results thereof and compiles an RNC connectivity map (not depicted). Additionally, the RNC/fBS aggregator 124 can compile additional information, such as location of fBS devices (102, 104, 106) and/or current loads, and incorporate that information into the RNC connectivity map. Such a map can be more complex, but can also provide better performance and smaller overhead, for instance.

The RNC/fBS aggregator 124 can manage an active set of fBS devices (102, 104, 106) for each call. The active set includes all suitable fBSs 102, 104, 106 within wireless range of a UE (112, 114, 116) (e.g., capable of supporting a UMTS, or like, cellular signal above a threshold signal strength level), and is provided to the RNC/fBS aggregator 124 by the UE (112, 114, 116). The active set can be modified by RNC/fBS aggregator 124 depending on connectivity parameters associated with particular fBSs (102, 104, 106) (e.g., as indicated in a connectivity map provided by a UE 112, 114, 116, an fBS 102, 104, 106, or generated at the RNC 124).

As an example to illustrate the foregoing, if fBS A 102 is in range of UE (fBS A) 112, but the fBS (102) is unable to deliver proper QoS support for a voice call, for instance, the RNC (124) can remove fBS A 102 from an active set associated with the voice call. Voice traffic can be routed to a different fBS (102, 104, 106), such as fBS B 104, and forwarded to fBS A 102 by way of A→B Link 108. As a result, control and synchronization of communication can be based on a dynamic connectivity map indicating concurrent transmission parameters for each fBS (102, 104, 106). System 100 therefore can provide a network of fBS devices (102, 104, 106) from an unplanned deployment of such devices (e.g., where devices are purchased and installed by nearby consumers without guidance, or with limited guidance, of a cellular provider) to deliver multi-base station cellular-type efficiency (as described herein) over an fBS connection.

Referring to FIGS. 2-8, methodologies relating to providing an fBS network for interfacing a cellular device with a cellular network are depicted. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts can be required to implement a methodology in accordance with one or more aspects.

Figure 2:
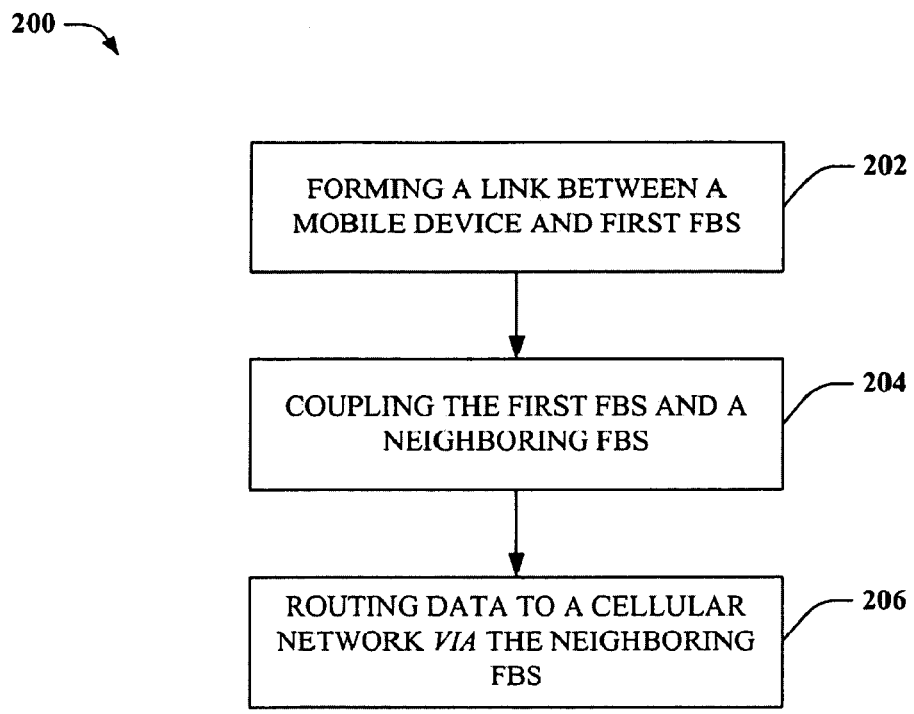
FIG. 2 depicts a flowchart of a sample methodology for interfacing a cellular device and a cellular network by way of a fBS network.

Referring now to FIG. 2, a flowchart of an example methodology 200 is depicted for providing an fBS backhaul network for interfacing UE devices with a cellular network. Method 200, at 202, can form a link between a mobile device and a first fBS. The link can be initiated by either the mobile device or the first fBS, or a third device for instance. In addition, the link can utilize a licensed cellular transmission frequency for communication between the fBS and mobile device. For example, a portion of a licensed UMTS TDD spectrum can be utilized (e.g., utilized by a network operator providing the first fBS). Other cellular transmission frequencies can be utilized, as well as other cellular transmission technologies (e.g., CDMA, time division multiple access (TDMA), frequency division multiple access (FDMA), etc.) and cellular transmission architectures (e.g., global system for mobile communication (GSM)). It should be appreciated that the communication link between the first fBS and the mobile device can be formed in substantially similar manner as is conventionally done between a cellular phone and a base station, such as a UMTS Node-B, a GSM base transceiver station (BTS), or like device.

At 204, method 200 can communicatively couple the first fBS and a neighboring fBS. For example, a WLAN connection (e.g., 802.11a, b, g, n, or the like) can be formed between such fBSs. Data can be transmitted over the WLAN connection as is typical for a local area network. Alternatively, or in addition, WLAN over cellular frequency can be implemented to couple the first and neighboring fBSs (e.g., WLAN over UMTS TDD). As another example, the base stations can be coupled by way of a wired connection, such as Ethernet. Further, a BPL connection can be utilized to communicatively couple the fBSs, or for instance, a portion of a licensed cellular frequency (e.g., UMTS TDD) distinct from that utilized to link the mobile device and the first fBS at reference number 202. It should also be appreciated that combinations of these or like coupling mechanisms can be utilized as well.

As a result of communicatively coupling the first and neighboring fBSs at reference number 204, an fBS network can be formed. At 206, at least a portion of traffic associated with the communication link can be routed to a cellular network by way of the neighboring fBS. For instance, the mobile device can send and receive cellular traffic (e.g., voice, video, audio, Internet traffic) to the first fBS via the communication link. The first fBS can then forward this traffic to the neighboring fBS by way of the communicative coupling between the fBSs established at reference number 204. The neighboring fBS can then forward the cellular traffic to a cellular network to facilitate cellular communication for the mobile device. Consequently, by communicatively coupling the first and neighboring fBS devices, the mobile device can interface with an fBS that it is best suited to communicate with, rather than being limited to one that is dedicated to carry traffic for the mobile device. As a result, mobile device power consumption, cellular interference, and transmission quality can be improved.

Figure 3:
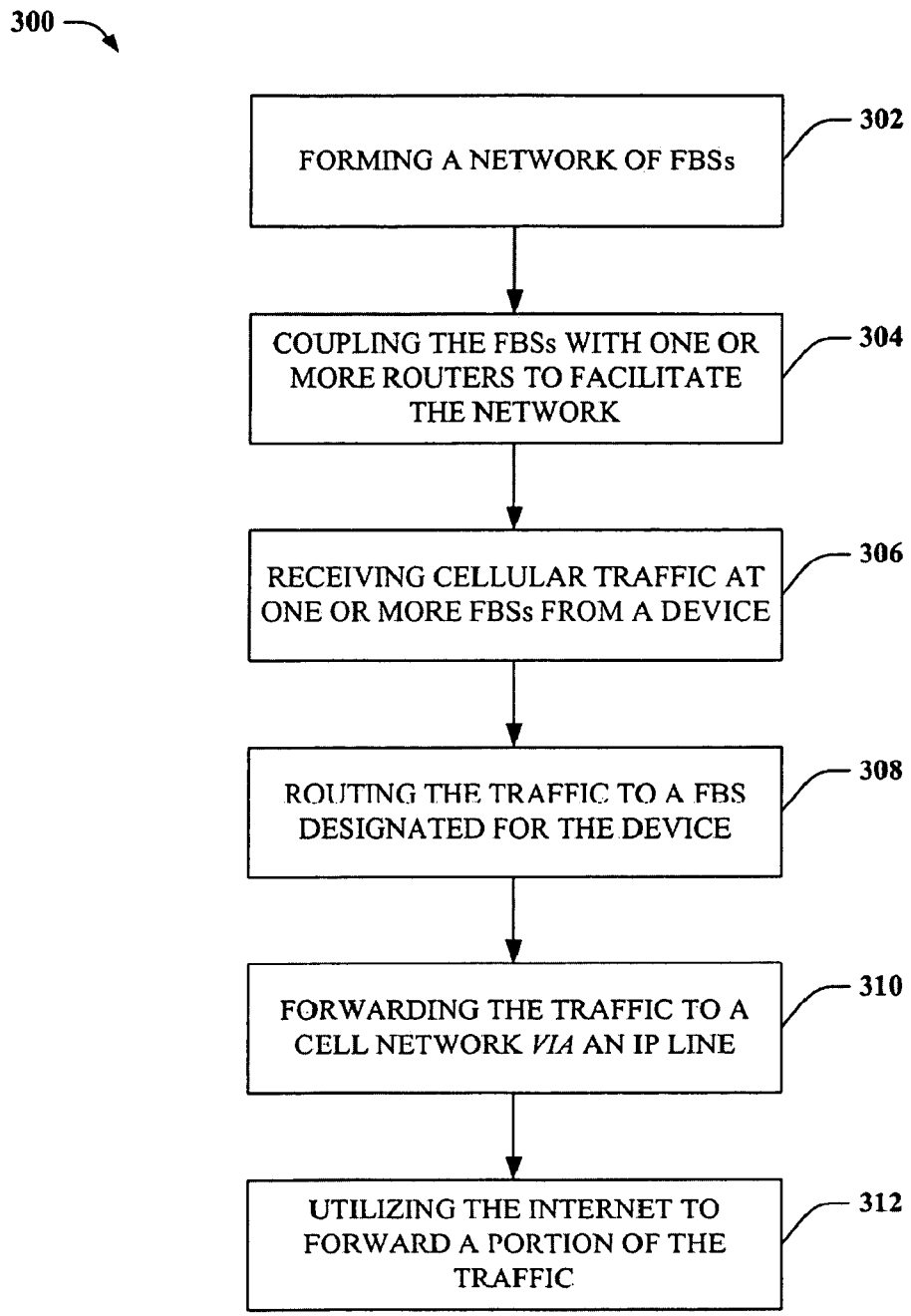
FIG. 3 illustrates a flowchart of an example methodology for providing high efficiency cellular communication by way of a fBS network.

Referring to FIG. 3, a flowchart of a sample methodology 300 is depicted for providing high efficiency cellular communication by way of a fBS network. At 302, a network of fBS devices can be formed. More specifically, a wired (e.g., Ethernet) and/or wireless (e.g., WLAN) network between multiple fBS devices can be established and utilized to facilitate communication between such devices. For example, at 304, each of the fBS devices can be coupled with a wireless 802.11 'x' router to facilitate wireless communication and formation of the fBS network. As a result of this network, the fBS devices can transmit data between them. Data can include cellular traffic to/from the mobile device, information from cellular equipment sent over an IP connection associated with one or more of the fBSs (see below), data and QoS parameters associated with broadcast transmission between the fBSs (or between an fBS and a mobile device), and so on.

At 306, cellular traffic can be received at one or more fBSs from a mobile device. If the cellular traffic is received at multiple fBS devices, it can be managed in a similar fashion as with a cellular soft hand-off, for instance. At 308, the cellular traffic is forwarded to an affiliated fBS that is dedicated to carry cellular traffic for the mobile device. For instance, the affiliated fBS can be configured to receive an identity of the mobile device and only transmit cellular traffic associated with that identity. At 310, the affiliated fBS can combine the traffic, if appropriate, and forward it to a cellular network via an IP connection.

An IP connection, as described herein, can include a hardwired data line for at least a portion of the last-mile connectivity to a consumer. Such a hard-wired data line can be a DSL line, a cable IP line, a BPL line, or combinations of these or like IP connections. An appropriate modem (e.g., DSL, cable) can interface an fBS with such an IP connection. As a result of the fBS network, method 300 can enable a mobile device to communicate with any suitable fBS on the network (e.g., considering distance, load, interference, or like conditions) and still have cellular traffic routed through an affiliated fBS and IP connection. It should be appreciated that each networked fBS can be associated with its own IP connection. Alternatively, or in addition, one or more of the fBSs can share an IP connection (e.g., if a consumer purchases two fBS devices for a business, each fBS can share an IP line owned/leased by the consumer as well).

In order to route traffic to a cellular network as described above, the IP connection can carry data to an IP server that can interface with the cellular network. At 312, for instance, the Internet can be utilized to forward the traffic from the fBS network to the cellular network. Particularly, the IP server can communicate with the cellular network by way of the Internet (or, e.g., a similar data network). As an alternative, a direct connection between the IP server and an RNC and/or fBS aggregator associated with the cellular network (e.g., pursuant to an agreement between an Internet service provider and a cellular provider) can be utilized instead. As a result of the interface between the fBS network and the cellular network, an fBS can serve as a local interface between the mobile device and the cellular network; data transmitted from the cellular network can be routed through an fBS dedicated for the mobile device to the fBS network. From there, one or more suitable fBSs (e.g., that are in close proximity to the mobile device, or have low concurrent load, or low interference) can route the traffic to the mobile device, and vice versa.

As described, method 300 enables a mobile device to communicate with any suitable fBS that is networked with an fBS affiliated with the mobile device. Therefore, even if a connection cannot be established with the affiliated fBS (or only a poor connection is available) high quality communication can still be achieved. Furthermore, by enabling a mobile device to interface with the nearest networked fBS device, low power consumption can be achieved for the mobile device, as compared with conventional fBS cellular connectivity.

Figure 4:
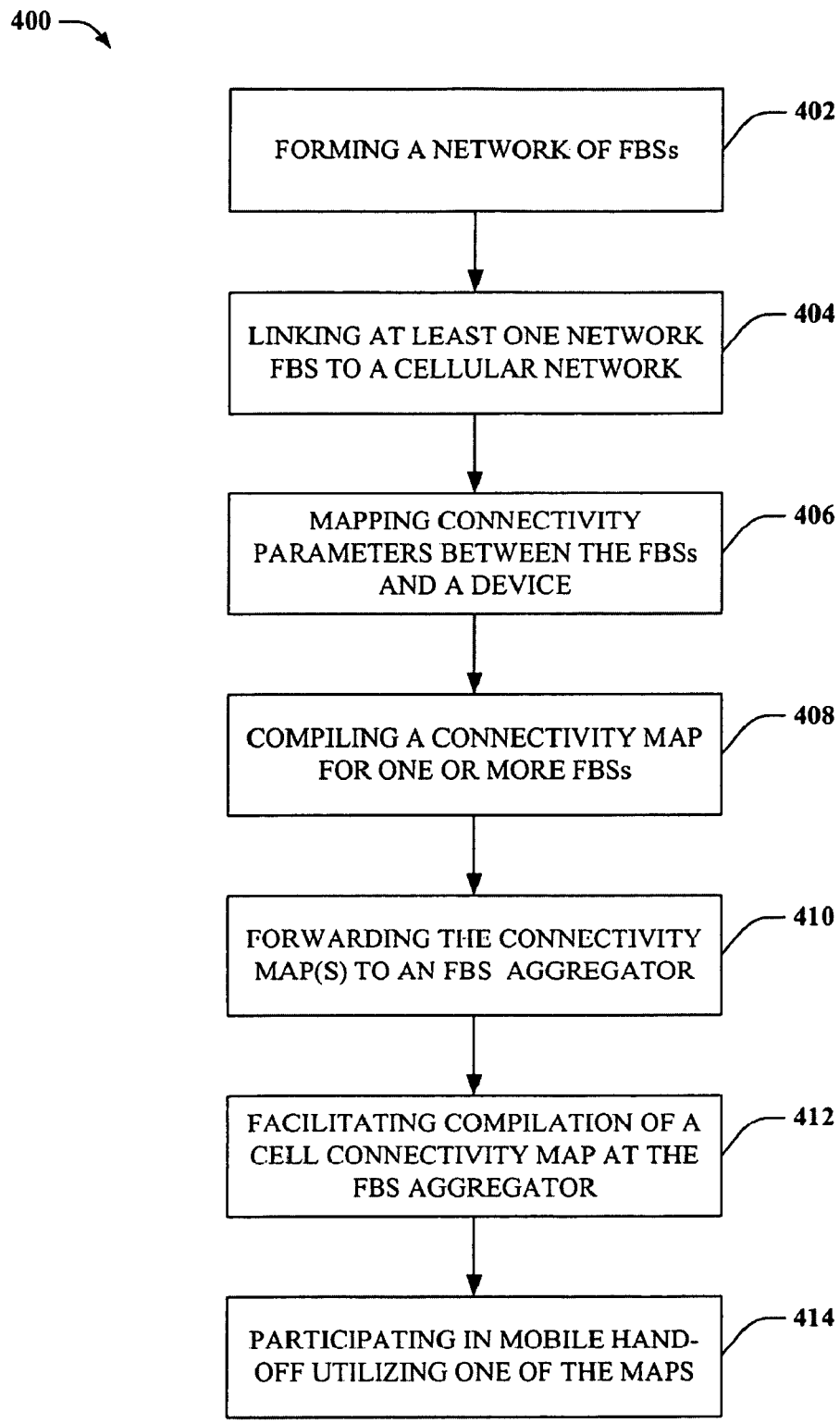
FIG. 4 illustrates a flowchart of an example methodology for providing hand-off between one or more networked fBSs in accordance with one or more aspects.

Referring now to FIG. 4, a flowchart of a methodology 400 for providing hand-off between one or more networked fBSs in accordance with one or more aspects is depicted. At 402, a network of fBS devices can be formed as described herein (e.g., utilizing WLAN, BPL and/or Ethernet connections between the fBS devices). At 404, at least one of the network fBS devices is linked to a cellular network. For example, the link can be by way of an IP connection associated with the networked fBS device, and a connection between an associated IP server and the cellular network, as described with respect to FIG. 3, supra. As a result, the fBS network can provide a communication interface between one or more mobile devices and the cellular network.

At 406, connectivity parameters between one or more networked fBS devices and a mobile device can be mapped. For instance, an fBS can analyze broadcast transmissions between the fBS and a neighboring fBS to measure the connectivity parameters. Such analysis can determine contemporaneous propagation, load, quality of service (QoS), interference, or availability parameters, or combinations thereof, associated with the first fBS for voice or for data traffic. In addition, a connection between the fBS and a mobile device can be analyzed to determine data rate to the device, power transmission of the device, QoS at the device, etc. At 408, a compilation of the connectivity parameters determined at an fBS can be utilized to compile a connectivity map for that fBS. In addition, each fBS of an fBS network can compile such a connectivity map based on connectivity parameters pertinent to that fBS.

At 410, one or more connectivity maps can be forwarded to a cellular RNC and/or fBS aggregator from one or more of the fBS devices on the fBS network. At 412, the connectivity map(s) can be utilized to compile a cell connectivity map, indicating connectivity parameters at each fBS for the fBS network. In addition, connectivity maps generated at each fBS can be sampled periodically in order to establish a contemporaneous connectivity map that fluctuates as fBS network transmission conditions change. Further, such contemporaneous connectivity maps can be periodically updated to the RNC/fBS aggregator in order to maintain a contemporaneous cell connectivity map at such device. At 414, an fBS device can participate in mobile hand-off utilizing at least one of the connectivity maps.

As an example, a connectivity map generated at a first fBS can be utilized to determine that a neighboring fBS can provide better service to a mobile device than the first fBS. For instance, the connectivity map can indicate that the neighboring fBS provides lower contemporaneous power transmission, higher data rate, lower interference, or better QoS, or the like, to the mobile device (e.g., due to load of the fBSs and/or proximity to the mobile device). The first fBS can then initiate a soft hand-off, instructing the mobile device to form a communication link with the neighboring fBS in addition to, or in lieu of, a communication link with the first fBS. Cellular traffic pertaining to the mobile device can then be delivered to the neighboring fBS to take advantage of the preferable transmission conditions that exist with respect to that device.

As an alternative example, an RNC/fBS aggregator can utilize a cell connectivity map indicating concurrent transmission connectivity parameters for each fBS of an fBS network, as well as each mobile device interfaced with such network (e.g., relying on data transmitted from the mobile device(s) to the RNC/fBS aggregator regarding mobile connectivity), to initiate a hand-off. Similar to that described above, the RNC/fBS aggregator can compare contemporaneous transmission parameters indicated in the cell connectivity map and determine a best fBS, or group of fBSs, for each mobile device. The RNC/fBS aggregator can instruct mobile devices to form communication links with the best fBS (or group) for each mobile device, in lieu of or in addition to links already established with other devices. Moreover, as described herein, cellular traffic pertaining to a specific mobile device can be routed an fBS dedicated to carry cellular traffic for the specific mobile device to the cellular network.

Figure 5:
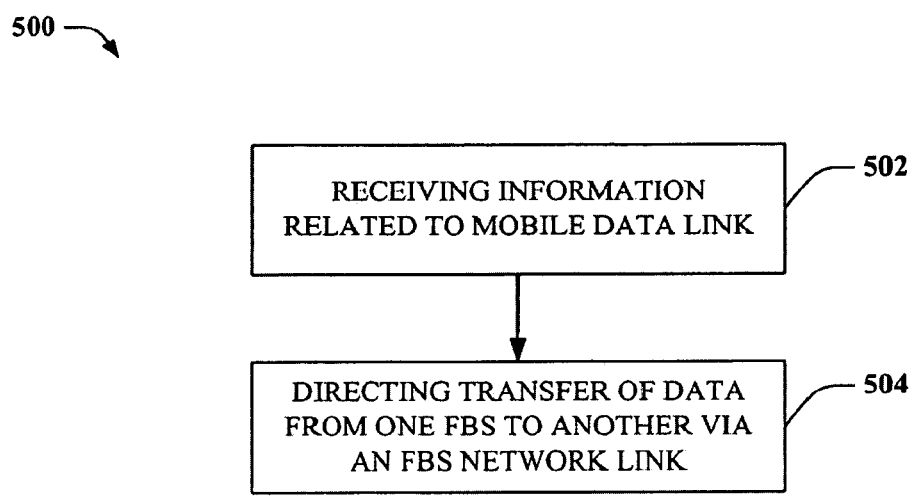
FIG. 5 depicts a flowchart of an example methodology for managing a fBS network according to additional aspects.

Referring now to FIG. 5, a flowchart of a methodology 500 is depicted for managing an fBS network according to additional aspects of the subject disclosure. At 502, information related to a data link between a first fBS device and a mobile device is received. The fBS device is connected to one or more additional fBS devices by way of a wireless and/or wired fBS network. Also, the data link is suitable for carrying cellular traffic between the device and the fBS. At 504, the received information is utilized to facilitate transfer of at least a portion of the cellular traffic carried over the data link. The transfer is from the first fBS to a neighboring fBS device by way of the fBS network. In addition, the neighboring fBS is communicatively coupled at least in part to a cellular link assigned to carry fBS-related traffic for the mobile device. As a result, the neighboring device can provide an interface between the mobile device and an associated cellular network.

Transfer of cellular traffic between the first fBS and the neighboring fBS can be based on transmission parameters associated with the fBSs and/or the mobile device. For instance, a component of the cellular network can determine that, although cellular traffic for the mobile device must be eventually carried by the neighboring fBS, the first fBS can provide a better data rate, QoS, lower interference, less power consumption, etc., for the mobile device. As a result, a direct fBS-mobile device interface can be with the first fBS, where cellular traffic is then routed to the neighboring fBS for transfer to the cellular network. Logic for determining the best suitable connectivity can be at a cellular network component such as an RNC or a fBS aggregator. Such component(s) can receive connectivity information from the first or neighboring fBS in order to facilitate the determination. As a result, method 500 can provide logic at a cellular network that can route cellular traffic between networked fBS devices in order to deliver that traffic to an fBS(s)/IP connection(s) designated for one or more mobile devices.

Figure 6:
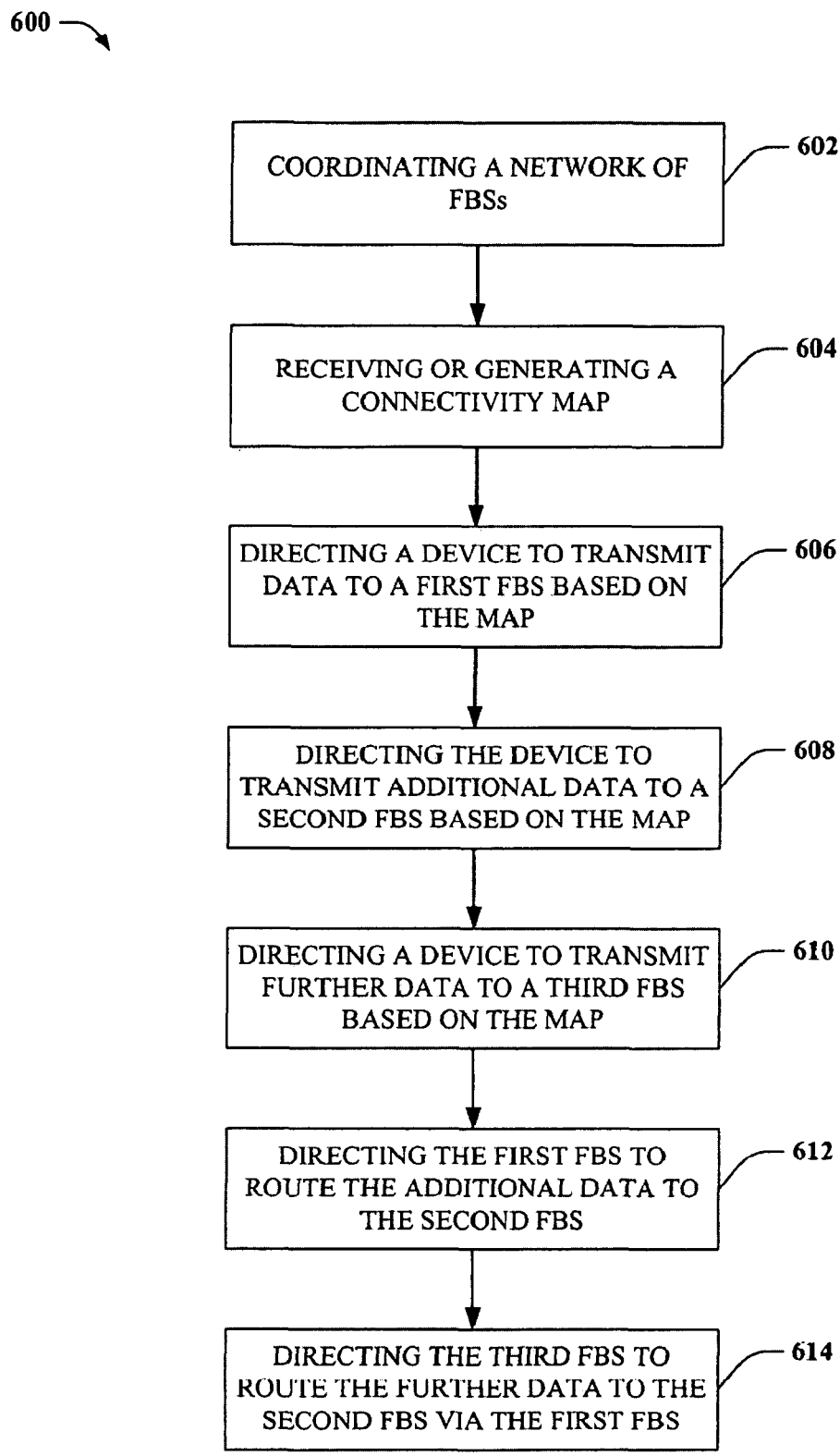
FIG. 6 depicts a flowchart of a sample methodology for mapping fBS connectivity to optimize a fBS-cellular interface.

Referring now to FIG. 6, a flowchart of an exemplary methodology 600 is depicted for mapping fBS connectivity to optimize a fBS-cellular interface. At 602, a network of fBS devices is coordinated. The network enables inter-connection of fBS devices such that data can be transferred amongst the devices. In addition, diagnostic analysis can be initiated at each of the fBSs in order to determine transmission connectivity parameters associated with such data transfer.

At 604, a connectivity map is received and/or generated at cellular network equipment (e.g., RNC, fBS aggregator) connected to the fBS network. The connectivity map can be compiled based on the diagnostic analysis performed at the fBS devices. Particularly, such diagnostics can determine load, capacity, wireless availability, interference, QoS, and related transmission parameters associated with wireless and/or cellular communication, at one or more of the fBS devices. Determined parameters can be forwarded to cellular network equipment by way of a connection between the fBS network and cellular equipment. In addition to the foregoing, logic at the cellular network can query fBS devices, and/or mobile devices interfaced with the fBS network, to determine any of the above parameters, as well as transmission power associated with the mobile devices, and an active set of fBSs associated with each mobile device. Results of the query received at the cellular network can be incorporated into the connectivity map, as suitable.

At 606, a mobile device is directed by the cellular network to transmit data to a first fBS. At 608, the mobile device is also directed to communicate additional data to a second fBS. In addition, the second fBS can be dedicated to route traffic associated with the mobile device to a cellular network, as described above. Furthermore, at 610, the mobile device is directed to transmit further data to a third fBS. As described, method 600 can direct the mobile device to maintain concurrent or alternating communication with multiple fBS devices. As transmission properties change, such as signal strength (e.g., based on proximity) to the first, second, and/or third fBSs, transmission power for communicating with such fBSs, QoS support, data rate, and the like, the mobile device can utilize any of these fBSs as suitable to interface with an fBS network.

In order to provide cellular traffic with a cellar network, traffic associated with a mobile device is routed to an fBS dedicated for that mobile device. Thus, at 612, the first fBS is directed to forward data received from the mobile device to the second fBS. Also, at 614, the third fBS can be directed to route data received from the mobile device to the second fBS as well. Furthermore, if no direct connection between the third fBS and second fBS exist, the first fBS can be utilized as an intermediary; specifically, the cellular network can direct the third fBS to forward data to the first fBS, and then from the first to the second fBS. As a result, multi-hop routing can be effectuated by the fBS network. For instance, the connectivity map generated at reference number 604 can be utilized to map contemporaneous transmission parameters for all fBS devices that can communicate with the second fBS device (dedicated to routing traffic from the mobile device to the cellular network). Such a map can then provide an indication of a most suitable route (e.g., minimizing latency, transmission power, interference, and/or maximizing QoS, data rate, or combinations of these or like parameters) with which to perform multi-hop fBS data transfers.

As described, by mapping fBS network connectivity at each fBS access point, method 600 can provide soft-handoff and single and multi-hop access point transfer to effectuate multi-base station cellular-like benefits in fBS cellular connectivity. In addition, the benefits can be provided in conjunction with routing traffic from each mobile device to a predetermined fBS/IP connection. As a result, method 600 can provide substantial benefits over conventional fBS cellular connectivity.

Figure 7:
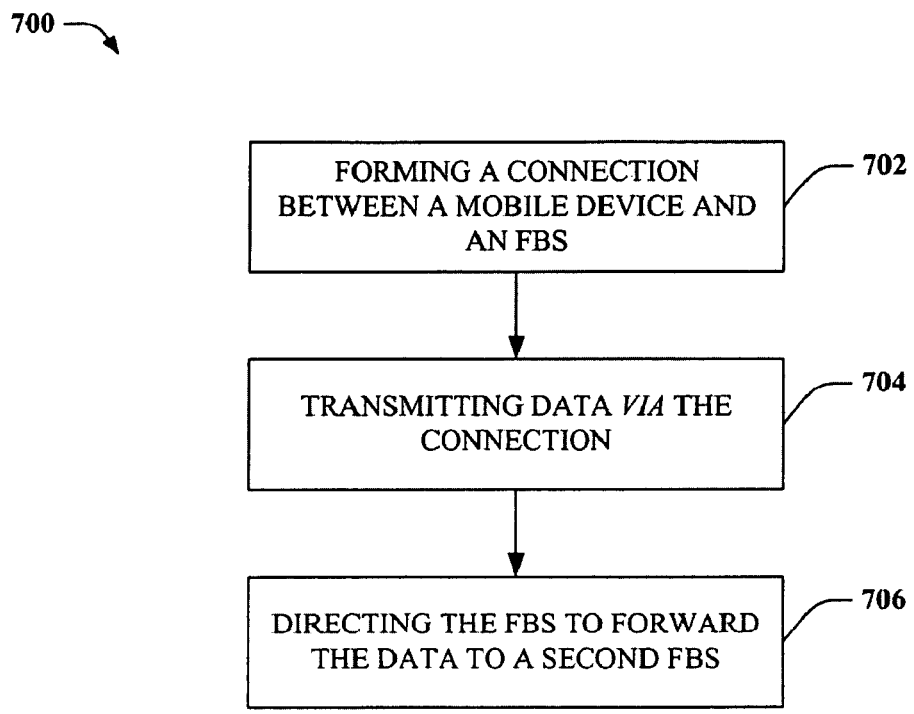
FIG. 7 depicts a flowchart of an example methodology for utilizing a fBS network to interface with a cellular network.

FIG. 7 depicts a flowchart of an example methodology 700 for utilizing a fBS network to interface with a cellular network. Method 700 can be implemented at one or more mobile devices, for instance. At 702, method 700 can form a wireless communication between a mobile device and an fBS. Particularly, the fBS can be part of a network of at least two fBS devices, as described herein. At 704, at least a portion of cellular traffic can be transmitted to the fBS by way of the wireless communication. At 706, the fBS can be directed to forward the portion of the cellular traffic to a second fBS device. As described herein, the transfer can be accomplished by way of a wired or wireless connection between the first and second fBS devices. In addition, the second fBS can be connected with a cellular interface affiliated with the mobile device. Although conventionally a mobile device must communicate with the affiliated fBS directly, method 700 can circumvent this requirement by directing a networked fBS to forward traffic to the affiliated fBS at reference number 706. As a result, method 700 can enable a mobile device to communicate with any suitable fBS that bears a connection to the affiliated fBS, and that can form the wireless communication with the mobile device.

Figure 8:
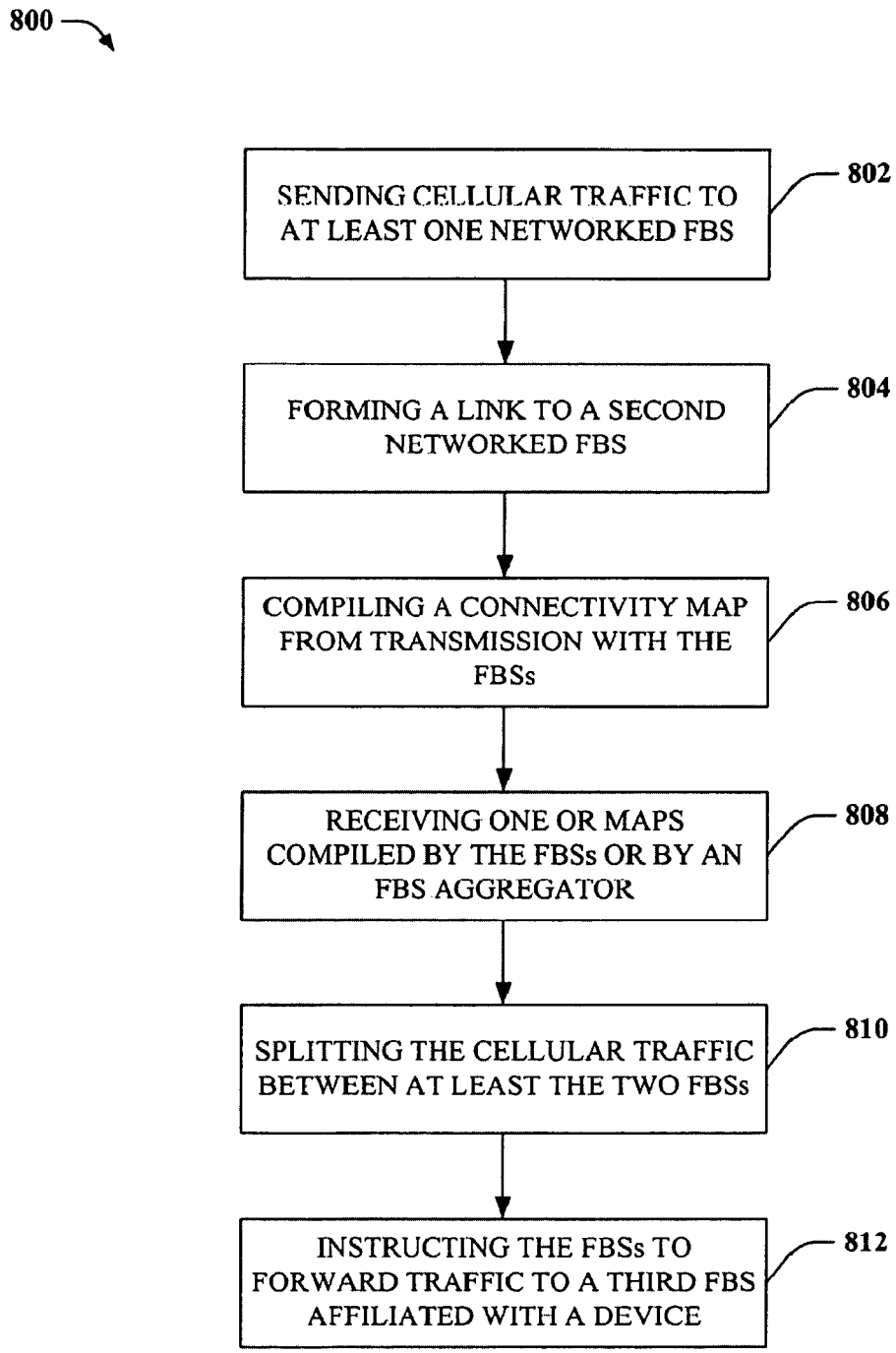
FIG. 8 depicts a flowchart of a sample methodology for facilitating optimizing mobile device and fBS communications.

FIG. 8 illustrates a flowchart of an additional example methodology 800 related to interfacing with an fBS network to effectuate cellular communication. At 802, cellular traffic is sent to a first fBS device. The first fBS device can be a part of the fBS network, for example. At 804, a link is formed between the mobile device and a second fBS device, which can also be a part of the fBS network. At 806, a connectivity map is compiled based on broadcast transmissions between the first and/or second fBS and the mobile device, as described herein or known in the art. At 808, an additional connectivity map(s) is received from the second fBS or an RNC/fBS aggregator connected to the fBS network (e.g., by way of the Internet or a direct IP/cellular link). Such a connectivity map can indicate concurrent transmission parameters of the second fBS, if received from that fBS, or of all fBS devices in the fBS network, if received from the RNC/fBS aggregator.

At 810, the mobile device performs a soft hand-off with the fBS network, by concurrently or alternatively transmitting data to the second fBS and the first networked fBS. The soft hand-off can be managed by utilizing data in the connectivity map(s) in order to maintain low power and lower interference transmission with the fBS network. At 812, the first networked fBS and second fBS can be instructed to forward cellular traffic received from the mobile device to a third fBS. Particularly, the third fBS can be predetermined to route cellular traffic associated with the mobile device to a cellular network. As described therefore, method 800 can effectuate mobile hand-off with an fBS network utilizing logic located at a mobile device.

Figure 9:
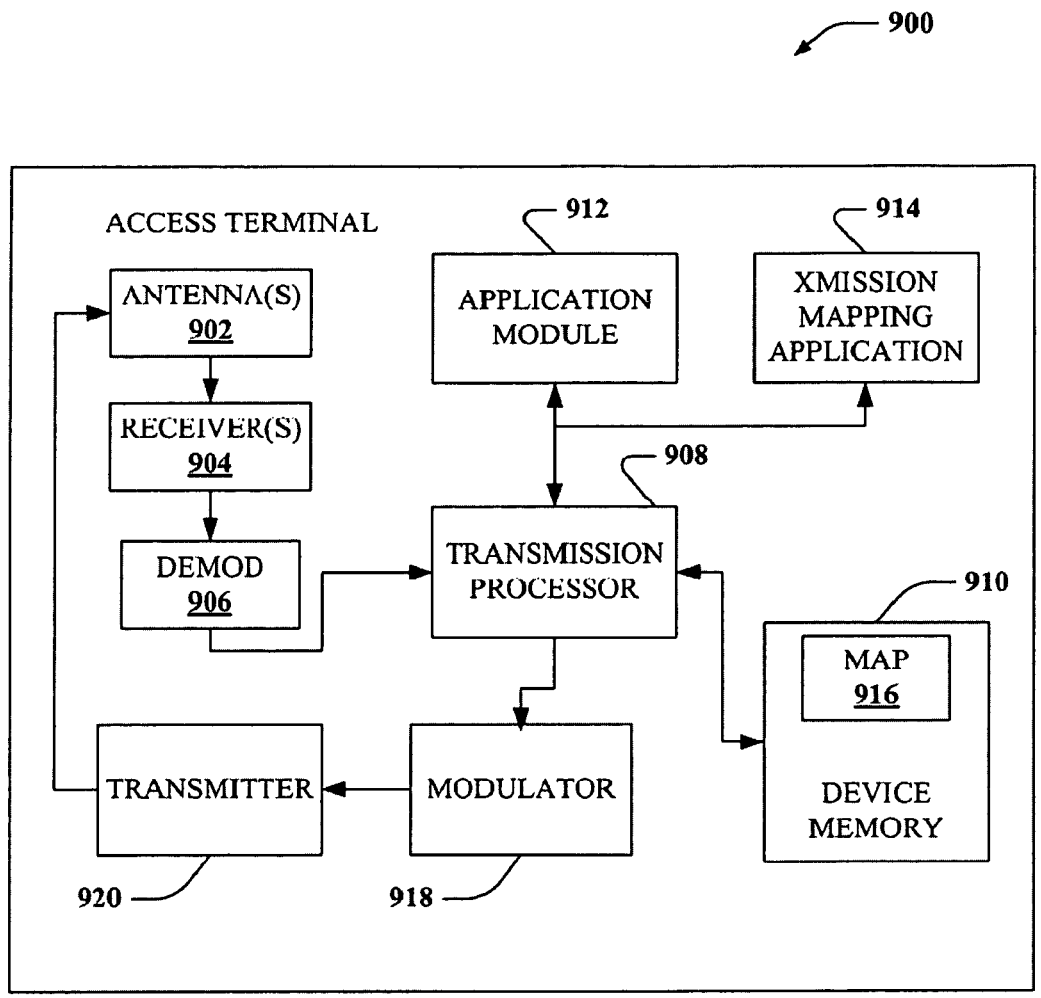
FIG. 9 illustrates a block diagram of a sample mobile device in accordance with various aspects set forth herein.

FIG. 9 illustrates a sample mobile device that can interface with an fBS network for cellular access in accordance with one or more embodiments. Mobile device 900 includes at least one antenna 902 (e.g., a transmission receiver or group of such receivers comprising an input interface) that receives a signal (e.g., containing information related to a data link between a first fBS and mobile device 900) and at least one receiver 904 that performs typical actions (e.g., filters, amplifies, down-converts, etc.) on the received signal. Specifically, antenna(s) 902 can receive information from one or more cellular base stations or fBSs (not depicted), as described herein, to participate in a communication link with such devices. For example, the antenna(s) 902 can receive a connectivity map from an fBS or a cellular network component that provides contemporaneous indication of transmission quality at various fBS access points in range of the antenna(s) 902.

Antenna 902 and receiver 904 can also be connected to a demodulator 906 that can demodulate received symbols and provide them to a transmission processor 908 for evaluation. Transmission processor 908 can be a processor dedicated to analyzing information received by antenna(s) 902 and/or generating information for transmission by a transmitter 920. Additionally, transmission processor 908 can control one or more components of mobile device 900, and/or analyze information received by antenna(s) 902, generate information for transmission by transmitter 920, and control one or more components of mobile device 900. Additionally, transmission processor 908 can access an application module 912 stored in device memory 910 to execute instructions for directing an fBS device to route traffic to other networked fBS devices (e.g., where at least one of the other networked fBS devices is dedicated to carrying traffic associated with mobile device 900). As a result, transmission processor 908 can facilitate cellular hand-off in an fBS network environment.

In addition to the foregoing, transmission processor 908 can include instructions to forward received data to one or more fBS devices within data that is broadcast by transmitter 920 (e.g., either directly or by way of another fBS). For instance, transmission processor 906 can facilitate broadcasting a second portion of cellular traffic that can be received by at least a second fBS dedicated to carry such traffic for the mobile device 900 (e.g., by determining that the second fBS is in range of the mobile device 900). Alternatively, transmission processor 908 can direct the second portion of data to be transmitted to a third fBS and direct the third fBS to route the data to the second fBS (e.g., by way of the instructions included within the broadcast data). Instructions can be generated based on contemporaneous transmission parameters associated with the fBS devices.

Mobile device 900 can additionally comprise device memory 910 that is operatively coupled to transmission processor 908 and that can store data to be transmitted, received, and the like. Furthermore, memory 910 can store application modules for mobile device 900. Application module 912 and transmission mapping application 914 can be two such modules stored within device memory 910 (see below).

It will be appreciated that a data store (e.g., device memory 910) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory (e.g., device memory 910) of the subject systems and methods is intended to comprise, without being limited to, these and any other suitable types of memory.

Application module 912 can be stored in device memory 908 and configured to generate instructions for an fBS to route cellular traffic to neighboring fBSs. For instance, the application module 912 can access data store in memory (908) and identify an fBS affiliated with mobile device 900. An instruction can be generated and sent (e.g., by transmission processor 908, modulator 916 and/or transmitter 920) to the fBS network identifying the affiliated fBS device and requesting traffic be forwarded to such device for transfer to a cellular network. In addition, routing instructions can be generated by application module 912 based on contemporaneous transmission parameters of one or more fBSs in the fBS network (e.g., determined by transmission mapping application 914). Particularly, application module 912 can reference the transmission parameters and determine a most efficient route to direct traffic from a receiving fBS to the affiliated fBS.

Also stored in device memory 910 is a transmission mapping application 914. The transmission mapping application 914 can be configured to monitor propagation, load, QoS, availability, power consumption, or interference parameters, or a combination of these or like parameters, associated with wireless communication between mobile device 900 and an fBS network. For instance, transmission mapping application 914 can monitor transmission information received at antenna 902 and/or sent by transmitter 920, determine parameters pertinent to mobile device 900, and compile a transmission map 916 based on the monitored parameters. In addition, the transmission mapping application 914 can generate queries that can be forwarded to one or more fBS devices in the fBS network. Responses to such queries can be utilized to modify the transmission map 916 to include transmission information pertaining to various fBS devices. Alternatively, or in addition, a query can be sent to an fBS aggregator to receive transmission information related to the fBS network compiled at an associated cellular network. Further, the transmission map 916 can be updated periodically to create a dynamic map indicating contemporaneous transmission characteristics. The transmission map 916 can then be referenced to determine suitable fBS access points based on such dynamic parameters.

Mobile device 900 still further comprises a modulator 918 and a transmitter 920 that transmits a signal (e.g., including a transmission data packet) for instance, to a base station (e.g., fBS or group of fBSs), an access point, another mobile device, a remote agent, etc. Although depicted as being separate from the transmission processor 908, it is to be appreciated that application module 912 and transmission mapping application 914 can be part of processor 908 or a number of processors (not shown), stored in cache memory, for instance.

Figure 10:
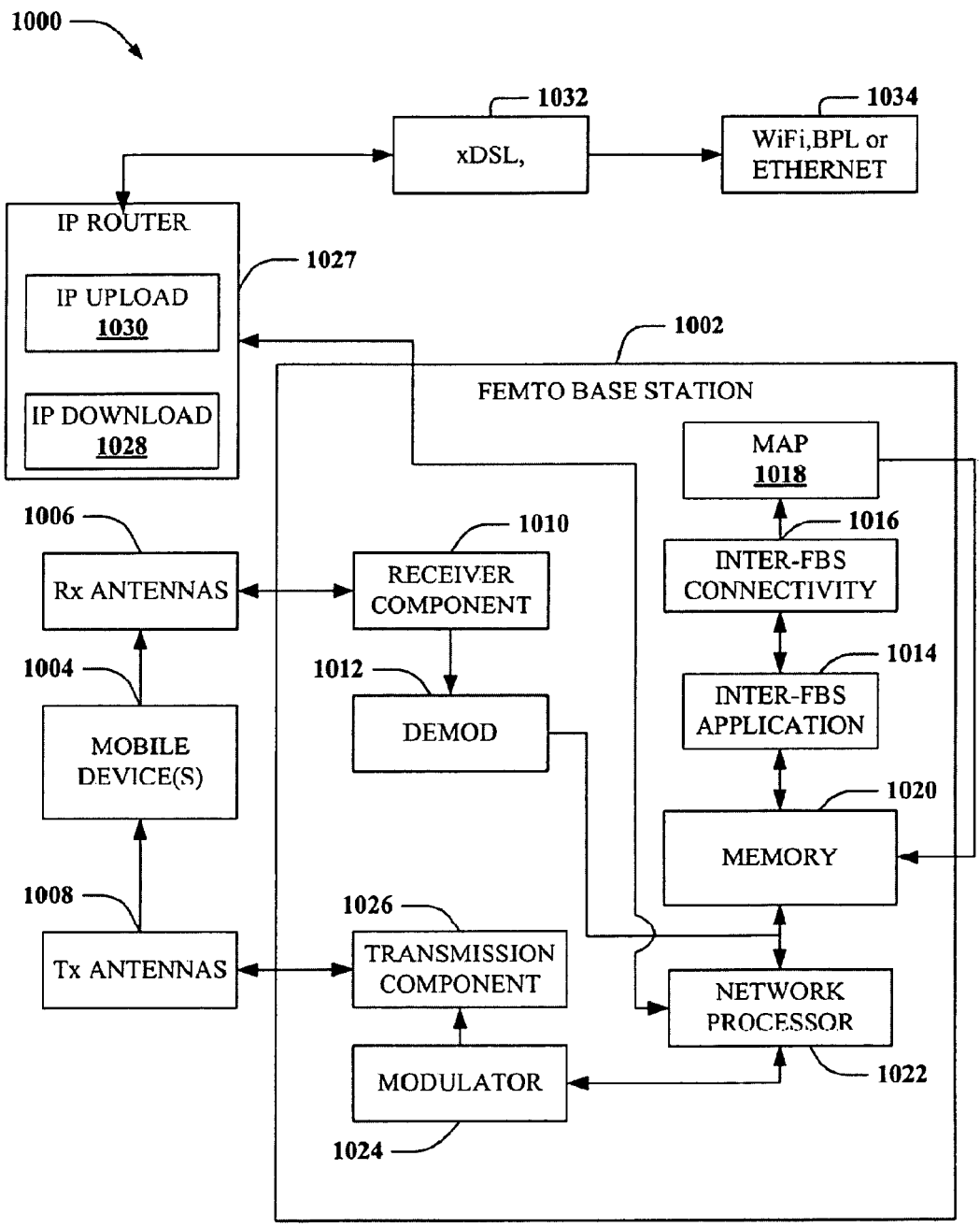
FIG. 10 depicts a block diagram of a sample femto Base Station (fBS) in accordance with additional aspects.

FIG. 10 is an illustration of a system 1000 that can interface mobile devices (1004) with a cellular network (not depicted) by way of a network of fBS devices. System 1000 includes an fBS 1002 (e.g., access point . . . ) with a receiver component 1010 that receives signal(s) from mobile device(s) 1004, or from other fBS devices (not depicted) through a plurality of receive antennas 1006. fBS 1002 also includes a transmission component 1026 that transmits to the mobile device(s) 1004 (or other fBS devices) through one or more transmit antennas 1008. Receiver component 1010 can receive information from receive antennas 1006 and can further comprise a signal recipient (not shown) that receives uplink data transmitted by the mobile devices. It should be appreciated that receiver component 1010 and transmission component 1026 can both include WLAN, BPL, Ethernet, UMTS TDD, or WLAN over UMTS TDD spectra communication capabilities in order to interact with mobile devices or with other fBS devices.

Receiver component 1010 is operatively associated with a demodulator 1012 that demodulates received information. Demodulated symbols are analyzed by a network processor 1022 that can generate additional signals (e.g., in the form of transmission and/or routing instructions) modulated by modulator 1024 and transmitted by transmission component 1026. Further, network processor 1022 can be coupled to a memory 1020. Memory 1020 stores information pertinent to effectuating wired and/or wireless communication, application modules (1014, 1016) for maintaining an fBS network and routing information between fBS devices and/or with connected mobile devices, and/or any other suitable information related to performing the various actions and functions set forth herein (see below).

Network processor 1022 can route at least a portion of traffic associated with a communication link between fBS 1002 and a mobile device (1004) to a neighboring fBS (not depicted) for transfer to a cellular network (e.g., by way of a direct connection to the cellular network, or by way of the Internet). Furthermore, network processor 1022 is configured to direct traffic affiliated with the fBS 1002 (e.g., generated by a predetermined mobile device or group of mobile devices, for instance) directly to the cellular network by way of an IP upload link 1030 (e.g., DSL connection, such as ADSL, VDSL, HDSL etc., cable IP connection, BPL connection). In addition, data can be received from the cellular network via an IP download link 1028 (e.g., DSL, cable, BPL) and directed to a mobile device (1004) affiliated with the fBS 1002.

Memory 1020 can contain application modules that generate instructions for forming, maintaining and/or routing data within an fBS network. Specifically, memory 1020 can include an inter-fBS application module 1014 for directing cellular related traffic between the fBS 1002 and a neighboring fBS (not depicted). Additionally, memory 1020 can contain an inter-fBS connectivity application that maps connectivity between fBS 1002 and the neighboring fBS(s) to compile a connectivity map 1018 (e.g., that can be routed to a cellular network RNC for hand-off and multi-hop management). Such a connectivity map 1018 can establish contemporaneous propagation, load, QoS or availability parameters, or a combination of these or like parameters, associated with fBS 1002 or the neighboring fBS, or both. In addition, varying levels of such parameters associated with both voice or data traffic can be compiled within the connectivity map 1018.

In addition to the foregoing, receiver component 1010 and transmission component 1026 can receive and transmit, respectively, various information to/from a cellular network (e.g., via IP upload 1030 and/or IP download 1028) or to/from other fBS devices of the fBS network by way of an IP router 1027 that communicates over unlicensed frequencies or wired connections (e.g., WLAN router, LAN router, or the like). For example, receiver component 1010 can receive an fBS network map from a cellular network RNC that indicates inter-fBS connectivity parameters for each fBS on the fBS network. Such parameters can be utilized to coordinate multi-hop routing of cellular traffic from within the fBS network. Additionally, instructions for such routing or for managing a soft hand-off with mobile device(s) 1004 can be received from the RNC. Additionally, inter-fBS connectivity parameters can be received from other fBS devices themselves (e.g., because of a broadcast transmission query generated by network processor 1022 and transmitted by transmission component 1026). In such a case, inter-fBS connectivity application 1016 can include connectivity parameters associated with other networked fBS devices into a connectivity map (described above). The connectivity map can then be utilized by network processor 1022 to direct soft hand-off and/or multi-hop routing as described herein.

Figure 11:
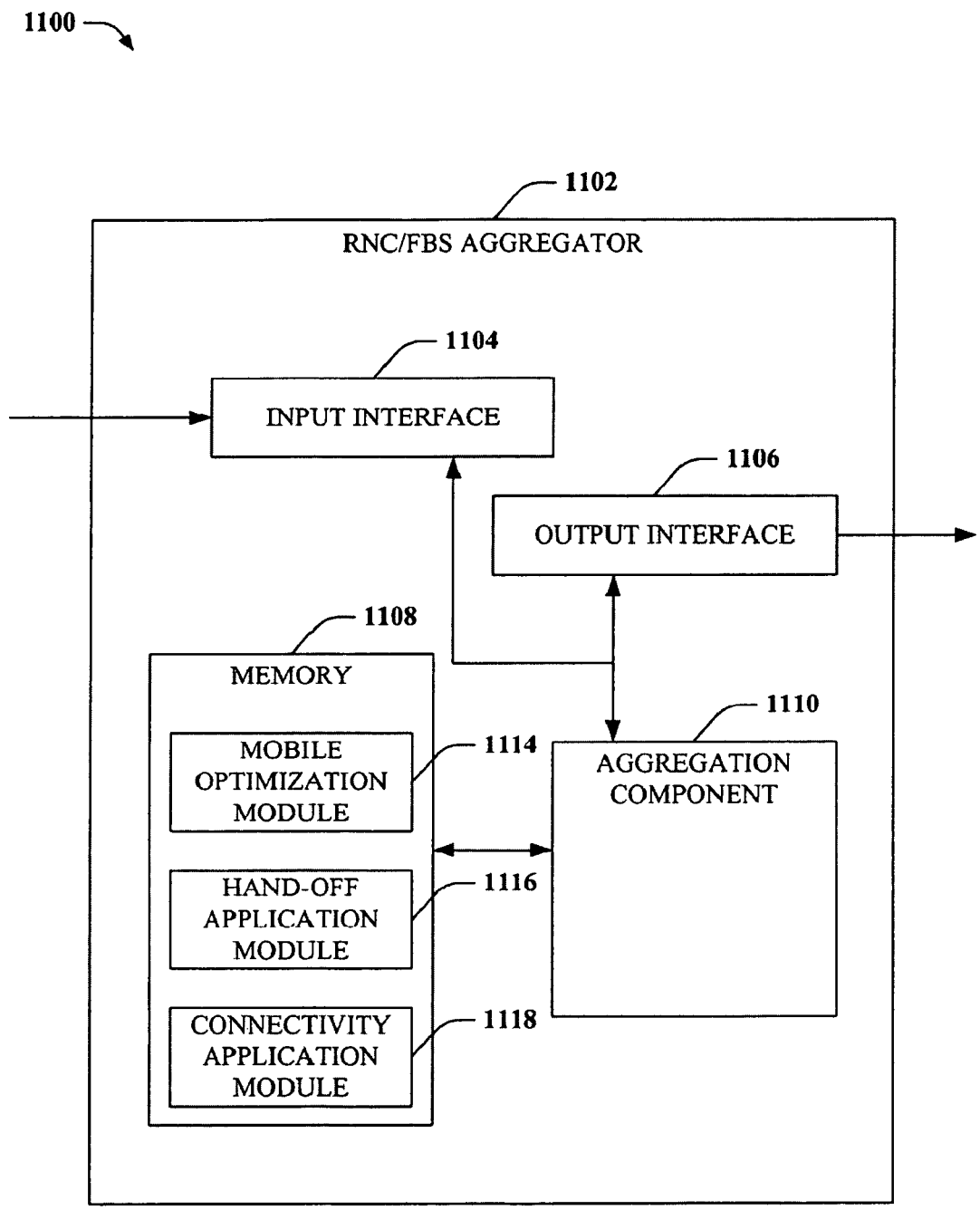
FIG. 11 depicts a block diagram of an example radio network controller (RNC) or fBS aggregator that can manage a fBS network and fBS hand-off.

Referring now to FIG. 11, a block diagram of an example radio network controller (RNC)\fBS aggregator 1100 that can manage an fBS network and fBS hand-offs is depicted. RNC/fBS aggregator 1102 is a governing entity in a cellular network that is responsible for managing traffic from a group of fBSs (not depicted). Typically one or more fBS devices are connected to an IP connection and subsequently to an IP server, as described herein. The RNC/fBS aggregator 1102 can connect with such an IP server, either through the Internet or by a direct connection to such a server, to interface with the fBS network.

Input interface 1104 can receive incoming signals related to an fBS network (not depicted) (e.g., through the Internet or an IP server), specifically, information related to a data link between fBS devices and mobile cellular devices. Output interface 1106 can be utilized to send signals (e.g., instructions, connectivity parameters) to such a network. The RNC/fBS aggregator 1102 can also include memory 1108 configured to store application modules associated with receiving and transmitting data, identifying network transmission parameters, and utilizing the parameters to optimize traffic flow through an fBS network. The RNC/fBS aggregator 1102 can also include an aggregation processor 1110 that facilitates transfer of at least a portion of cellular traffic carried over a data link(s) formed between an fBS device and mobile device, to another fBS device on the fBS network. Typically, such other network fBS device will be affiliated with an IP connection designated to carry traffic for the mobile device, as described herein. In addition, RNC/fBS aggregator 1102 can route such traffic associated with multiple data links pertaining to a plurality of mobile devices interfaced with a plurality of fBS devices concurrently. Aggregation processor 1110 can also utilize a connectivity map (see below) to manage a soft hand-off event for the mobile device and two or more fBS devices on the fBS network. For instance, instructions generated by network application and management modules (1114, 1116, 1118) can be processed and transmitted to the network by the aggregation processor 1110.

Memory 1108 can include a mobile optimization application module 1114 stored therein. The mobile optimization application module 1114 (module 1114) can include instructions for directing soft hand-off between two or more fBS and a mobile device. Specifically, the module 1114 can include instructions for directing the mobile device to transmit a first segment of cellular traffic directly to a first fBS affiliated with the mobile device. Additionally, the module 1114 can include instructions for directing the mobile device to transmit a second segment of cellular traffic to a second fBS. The second segment may be so directed because contemporaneous transmission with the second fBS may be preferable at a particular point in time (e.g., the mobile device may have moved closer to the other fBS, QoS or data rate for such fBS may be better suited to the cellular traffic, load amongst the affiliated fBS and the other fBS may have changed, and so on). Furthermore, the module 1114 can include instructions for directing the second fBS to route cellular traffic received from the mobile device to the first fBS for forwarding to a cellular network. As a result, the module 1114 can instruct the mobile device or one or more fBS devices to direct traffic as suitable, while maintaining a predetermined cellular network interface for the mobile device.

Memory 1108 can also include a connectivity application module (module 1118) stored in memory 1108. The module 1118 can be configured to compile an inter-fBS connectivity map from transmission parameters pertaining to broadcast transmissions between fBS devices on an fBS network, and mobile devices interfaced with the fBS network. For instance, the module 1118 can interrogate mobile devices and fBS devices by way of the fBS network, to determine propagation, load, interference, transmission power, or QoS parameters, or a combination of these or like parameters, associated with a data link between such devices. The parameters can be compiled periodically and used to generate a dynamic representation of traffic within the fBS network. For instance, a connectivity map can indicate traffic load for each networked fBS device. In addition, ping rate and packet consistency can be determined relating to traffic QoS. Thus, the connectivity map can enable RNC/fBS aggregator 1102 to identify where traffic can be directed to reduce load, mitigate interference, and so on.

Memory 1108 can also include a hand-off application module 1116 (module 1116) that is configured to utilize a connectivity map to manage a soft hand-off event for the mobile device and two or more fBS devices. For instance, as described above, the module 1116 can identify heavily loaded fBS devices, or fBS devices receiving particularly good QoS for voice traffic, or data rate for data traffic, etc., and manage mobile device interfaces with the fBS network accordingly. Furthermore, the module 1116 can facilitate multi-hop routing from an fBS device to other fBS devices. For example, if an fBS dedicated to a particular mobile device is not in direct contact with an fBS device having a communication link with the mobile device, module 1116 can direct traffic to be routed by way of one or more other intervening fBS devices, as described herein. In addition, mobile device hand-off utilizing such multi-hop routing techniques can be effectuated. For instance, cellular traffic transmitting to a first networked fBS device can be routed to a second fBS device in order to deliver the traffic to a third fBS that is affiliated with the mobile device.

Figure 12:
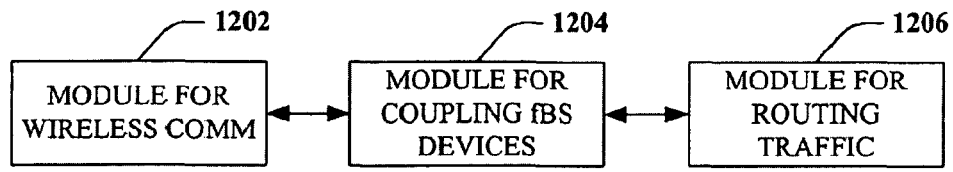
FIGS. 12 through 14 depict block diagrams of example systems that can utilize a network of fBSs to effectuate cellular communication in accord with one or more aspects.

FIG. 12 depicts an example block diagram of a system 1200 in accordance with additional aspects described herein. System 1200 provides an apparatus that can facilitate a fBS backhaul network to interface a mobile device with a cellular network. Specifically, system 1200 can include a module for wireless communication 1202. The module 1202 can form a communication link with at least one mobile device at a first fBS. For instance, the communication link can be by way of a licensed cellular radio band, such as UMTS TDD. In addition, system 1200 can include a module for coupling fBS devices 1204. Specifically, the module 1204 can couple the first fBS with at least a second, additional fBS. System 1200 can also include a module for routing traffic 1206, that can direct at least a portion of traffic associated with the communication link to a cellular network by way of the second fBS. More particularly, the module 1206 can direct the first fBS to forward traffic received from the mobile device to the second fBS for transmission to a cellular network.

Figure 13:
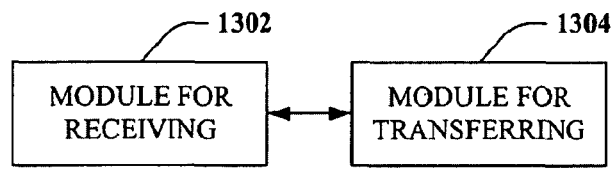

FIG. 13 illustrates a system 1300 that can manage and control traffic at fBS network from a cellular network affiliated with the fBS network. System 1300 can include a module for receiving information 1302. The module 1302 can receive information related to a data link between a mobile device and a first fBS device on an fBS network. The information can include an active set of fBS devices on the network, specifying all suitable fBS devices within range of the mobile device, transmission characteristics (e.g., load, interference, uplink power, etc.) associated with the data link, and so on. Furthermore, system 1300 can include a module for transferring data 1304, which can facilitate transfer of at least a portion of cellular traffic carried over the data link to a neighboring fBS device (e.g., having a WLAN link with the first fBS device). Such neighboring fBS device can be communicatively coupled at least in part to a cellular link assigned to carry fBS-related traffic for the mobile device. As a result, system 1300 can facilitate transfer of data from a mobile device to an assigned fBS device by way of any suitable fBS device networked with the assigned fBS. Consequently, transmission with the fBS network can be maximized while maintaining a predetermined interface between the mobile device and a cellular network.

Figure 14:
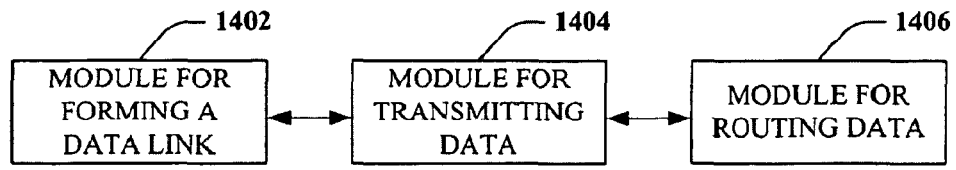

FIG. 14 illustrates a block diagram of a sample system 1400 that can interface with an fBS network to communicate with a cellular network. System 1400 can include a module for forming a data link 1402 between cellular devices. For instance, the module 1402 can utilize a UMTS TDD or like licensed cellular spectrum to form a data link with an fBS and a mobile device. A module for transmitting data 1404 can utilize the data link to transmit at least a portion of cellular traffic to the fBS. Furthermore, a module for routing data 1406 can instruct the fBS to route the portion of the cellular traffic transmitted over the wireless data link to a second fBS. The second fBS can be connected to a cellular interface affiliated with the mobile device, for instance. As a result, system 1400 can interface a mobile device with any suitable fBS that is networked with a particular fBS affiliated with the mobile device. In addition, data can be routed through the network to such affiliated fBS in order to communicate with a cellular network.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The previous description of the disclosed aspects is provided to enable any person skilled in the art to make or use the present disclosure. Various modifications to these aspects may be readily apparent to those skilled in the art, and the generic principles defined herein may be applied to other aspects without departing from the spirit or scope of the disclosure. Thus, the present disclosure is not intended to be limited to the aspects shown herein but is to be accorded the widest scope consistent with the principles and novel features disclosed herein.

What is claimed is:

1. A method for managing a multi-femto base station ("fBS") interface to a cellular network, comprising:
receiving information related to a data link between a first fBS and a mobile device;
compiling an inter-fBS connectivity map based at least in part on the received information;
utilizing the received information and the connectivity map to facilitate transfer of at least a portion of cellular traffic carried over the data link to a neighboring fBS, wherein the neighboring fBS is communicatively coupled at least in part to a cellular link assigned to carry fBS-related traffic for the mobile device; and receiving connectivity parameters from the first fBS, the neighboring fBS, or the mobile device, or a combination thereof, to facilitate the transfer of at least a portion of cellular traffic carried over the data link to the neighboring fBS.

2. The method of claim 1, further comprising directing a soft hand-off of the portion of cellular traffic between the first fBS and the neighboring fBSs, comprising at least one of:
directing the mobile device to transmit a first segment of the cellular traffic received by the neighboring fBS for transmission to a cellular network;
directing the mobile device to transmit a second segment of the cellular traffic received by the first fBS;
directing the first fBS to route the second segment of the cellular traffic to the cellular network by way of the neighboring fBS; or
directing compensation be given to an owner of the first fBS for at least part of the time or bandwidth, or both, required to transfer at least a portion of cellular traffic associated with the data link that is transferred to the cellular network by way of at least the first fBS.

3. The method of claim 1, wherein the connectivity parameters provide a dynamic indication of propagation, load, interference, transmission power, or QoS parameters, or a combination thereof, associated with the data link, or with a link between the first and neighboring fBSs.

4. The method of claim 1, further comprising:
compiling the connectivity map based at least in part on the received connectivity parameters; and
utilizing the connectivity map to manage a soft hand-off event for the mobile device between the first fBS and the neighboring fBS.

5. The method of claim 1, further comprising:
interrogating the mobile device, the first fBS or the neighboring fBS, or a combination thereof, to determine propagation, load, interference, transmission power, or QoS parameters, or a combination thereof, associated with the data link, a second data link between the mobile device and the neighboring fBS, or a transmission between the first and neighboring fBSs; and
compiling the connectivity map based at least in part on the connectivity parameter(s).

6. The method of claim 5, further comprising utilizing the connectivity map to manage a soft hand-off event for the mobile device between the first fBS and the neighboring fBS.

7. The method of claim 1, further comprising:
directing the mobile device to form a second data link with a third fBS where at least a second portion of cellular traffic is received by the third fBS over the second data link; and
directing the third fBS to route the second portion of cellular traffic to the neighboring fBS.

8. The method of claim 7, further comprising directing the third fBS to route the second portion of cellular traffic to the neighboring fBS by way of the first fBS.

9. The method of claim 1, further comprising:
receiving a list that identifies fBSs that are within communication range of the mobile device, including at least the first fBS;
dynamically interrogating the mobile device and at least a second fBS identified in the list to compile the connectivity map indicating concurrent transmission characteristics associated with the mobile device and at least the second fBS;
dynamically directing the mobile device to form a second data link with at least the second fBS if the connectivity map indicates the second fBS provides better transmission support than the first fBS; and
receiving the portion of cellular traffic transmitted from the mobile device at the neighboring fBS by way of the second data link.

10. An apparatus configured to manage a multi-fBS interface to a cellular network, comprising:
an input interface that is operable to receive information related to a data link between a first fBS and a mobile device;
memory at the apparatus configured to store application modules for the apparatus;
an aggregation processor operable to (a) compile an inter-fBS connectivity map based at least in part on the received information and (b) facilitate transfer of at least a portion of cellular traffic carried over the data link to a neighboring fBS based at least in part on the received information and the connectivity map, wherein the neighboring fBS is communicatively coupled at least in part to a cellular link assigned to carry fBS-related traffic for the mobile device; and
a transceiver operable to receive connectivity parameters from the first fBS, the neighboring fBS, or the mobile device, or a combination thereof, wherein the connectivity parameters provide information that facilitates the transfer of at least a portion of cellular traffic carried over the data link to the neighboring fBS.

11. The apparatus of claim 10, further comprising a mobile optimization application module stored in the memory, the mobile optimization application module further comprises at least one of:
instructions for directing the mobile device to transmit a first segment of the cellular traffic directly to the neighboring fBS for transmission to a cellular network;
instructions for directing the mobile device to transmit a second segment of the cellular traffic directly to the first fBS;
instructions for directing the first fBS to route the second segment of the cellular traffic to the cellular network by way of the neighboring fBS; or
instructions for directing compensation be given to an owner of the first fBS for at least part of the time or bandwidth, or both, required to transfer at least a portion of cellular traffic associated with the data link that is transferred to the cellular network by way of at least the first fBS.

12. The apparatus of claim 10, further comprising a hand-off application module stored in the memory and configured to (a) compile the connectivity map based at least in part on the received connectivity parameters and (b) utilize the connectivity map to manage a soft hand-off event for the mobile device between the first fBS, the neighboring fBS, and a third fBS, utilizing multi-hop routing between the first, third, and neighboring fBS.

13. The apparatus of claim 10, wherein the aggregation processor is further configured to:
direct the mobile device to form a second data link with a third fBS and transmit at least a second portion of cellular traffic over the second data link to the third fBS; and
direct the third fBS to route the second portion of cellular traffic to the neighboring fBS.

14. The apparatus of claim 13, wherein the aggregation processor directs the third fBS to route the second portion of cellular traffic to the neighboring fBS by way of the first fBS.

15. The apparatus of claim 10, wherein the transceiver is further operable to receive a list from the mobile device that identifies fBSs that are within communication range of the mobile device, including at least the first fBS, and the aggregation processor is further configured to:

dynamically interrogate the mobile device and at least a second fBS identified in the list to compile the connectivity map indicating concurrent transmission characteristics associated with the mobile device and at least the second fBS;

dynamically direct the mobile device to form a second data link with at least the second fBS if the connectivity map indicates the second fBS provides better transmission support than the first fBS; and direct the mobile device to transmit the portion of cellular traffic to the neighboring fBS by way of the second data link.

16. An apparatus configured to manage a multi-fBS interface to a cellular network, comprising:

an input interface that is operable to receive information related to a data link between a first fBS and a mobile device;

memory at the apparatus configured to store application modules for the apparatus; and an aggregation processor operable to (a) compile an inter-fBS connectivity map based at least in part on the received information and (b) facilitate transfer of at least a portion of cellular traffic carried over the data link to a neighboring fBS based at least in part on the received information and the connectivity map, wherein the neighboring fBS is communicatively coupled at least in part to a cellular link assigned to carry fBS-related traffic for the mobile device; and a connectivity application module stored in the memory and configured to:

interrogate the mobile device, the first fBS or the neighboring fBS, or a combination thereof, to determine propagation, load, interference, transmission power, or QoS parameters, or a combination thereof, associated with the data link, a second data link between the mobile device and the neighboring fBS, or a transmission between the first and neighboring fBSs; and compile the connectivity map based at least in part on the received information.

17. The apparatus of claim 16, wherein the aggregation processor utilizes the connectivity map to manage a soft hand-off event for the mobile device and the first and neighboring fBSs.

18. At least one processor configured to manage a multi-fBS interface to a cellular network, comprising:

a first module for receiving information related to a data link between a first fBS and a mobile device;

a second module for compiling an inter-fBS connectivity map based at least in part on the received information;

a third module for facilitating transfer of at least a portion of cellular traffic carried over the data link to a neighboring fBS based at least in part on the received information and the connectivity map, wherein the neighboring fBS is communicatively coupled at least in part to a cellular link assigned to carry fBS-related traffic for the mobile device; and a fourth module for receiving connectivity parameters from the first fBS, the neighboring fBS, or the mobile device, or a combination thereof, to facilitate the transfer of at least a portion of cellular traffic carried over the data link to the neighboring fBS.

19. An apparatus that manages a multi-fBS interface to a cellular network, comprising:

means for receiving information related to a data link between a first fBS and a mobile device;

means for compiling an inter-fBS connectivity map based at least in part on the received information;

means for facilitating transfer of at least a portion of cellular traffic carried over the data link to a neighboring fBS based at least in part on the received information and the connectivity map, wherein the neighboring fBS is communicatively coupled at least in part to a cellular link assigned to carry fBS-related traffic for the mobile device; and means for receiving connectivity parameters from the first fBS, the neighboring fBS, or the mobile device, or a combination thereof, to facilitate the transfer of at least a portion of cellular traffic carried over the data link to the neighboring fBS.

20. A computer program product, comprising:

a non-transitory computer-readable medium, comprising:

a first set of codes operable to cause a computer to receive information related to a data link between a first fBS and a mobile device;

a second set of codes for compiling an inter-fBS connectivity map based at least in part on the received information; and a third set of codes operable to cause the computer to facilitate transfer of at least a portion of cellular traffic carried over the data link to a neighboring fBS, the neighboring fBS is communicatively coupled at least in part to a cellular link assigned to carry fBS-related traffic for the mobile device; and code operable to cause a computer to receive connectivity parameters from the first fBS, the neighboring fBS, or the mobile device, or a combination thereof, to facilitate the transfer of at least a portion of cellular traffic carried over the data link to the neighboring fBS.

21. The computer program product of claim 20, wherein the computer-readable medium further comprises code operable to cause a computer to direct a soft hand-off of the portion of cellular traffic between the first fBS and the neighboring fBSs, comprising at least one of:

directing the mobile device to transmit a first segment of the cellular traffic received by the neighboring fBS for transmission to a cellular network;

directing the mobile device to transmit a second segment of the cellular traffic received by the first fBS;

directing the first fBS to route the second segment of the cellular traffic to the cellular network by way of the neighboring fBS; or directing compensation be given to an owner of the first fBS for at least part of the time or bandwidth, or both, required to transfer at least a portion of cellular traffic associated with the data link that is transferred to the cellular network by way of at least the first fBS.

22. The computer program product of claim 20, wherein the computer-readable medium further comprises code operable to cause a computer to obtain a dynamic indication of propagation, load, interference, transmission power, or QoS parameters, or a combination thereof, associated with the data link, or with a link between the first and neighboring fBSs from the connectivity parameters.

23. The computer program product of claim 20, wherein the computer-readable medium further comprises code operable to cause a computer to (a) compile the connectivity map based at least in part on the received connectivity parameters and (b) utilize the connectivity map to manage a soft hand-off event for the mobile device between the first fBS and the neighboring fBS.

24. The computer program product of claim 20, wherein the computer-readable medium further comprises code operable to cause a computer to:
- interrogate the mobile device, the first fBS or the neighboring fBS, or a combination thereof, to determine propagation, load, interference, transmission power, or QoS parameters, or a combination thereof, associated with the data link, a second data link between the mobile device and the neighboring fBS, or a transmission between the first and neighboring fBSs; and
- compile the connectivity map based at least in part on the connectivity parameter(s).

25. The computer program product of claim 24, wherein the computer-readable medium further comprises code operable to cause a computer to utilize the connectivity map to manage a soft hand-off event for the mobile device between the first fBS and the neighboring fBS.

26. The computer program product of claim 20, wherein the computer-readable medium further comprises code operable to cause a computer to:
- direct the mobile device to form a second data link with a third fBS where at least a second portion of cellular traffic is received by the third fBS over the second data link; and
- direct the third fBS to route the second portion of cellular traffic to the neighboring fBS.

27. The computer program product of claim 26, wherein the computer-readable medium further comprises code operable to cause a computer to direct the third fBS to route the second portion of cellular traffic to the neighboring fBS by way of the first fBS.

28. The computer program product of claim 20, wherein the computer-readable medium further comprises code operable to cause a computer to:
- receive a list that identifies fBSs that are within communication range of the mobile device, including at least the first fBS;
- dynamically interrogate the mobile device and at least a second fBS identified in the list to compile the connectivity map indicating concurrent transmission characteristics associated with the mobile device and at least the second fBS;
- dynamically direct the mobile device to form a second data link with at least the second fBS if the connectivity map indicates the second fBS provides better transmission support than the first fBS; and
- receive the portion of cellular traffic transmitted from the mobile device at the neighboring fBS by way of the second data link.

* * * * *